(12) United States Patent
Yabu

(10) Patent No.: US 9,025,872 B2
(45) Date of Patent: May 5, 2015

(54) IMAGE PROCESSING DEVICE, IMAGE PROCESSING METHOD, PROGRAM, AND INTEGRATED CIRCUIT

(75) Inventor: Hiroshi Yabu, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 161 days.

(21) Appl. No.: 13/823,914

(22) PCT Filed: Aug. 6, 2012

(86) PCT No.: PCT/JP2012/004992
§ 371 (c)(1),
(2), (4) Date: Mar. 15, 2013

(87) PCT Pub. No.: WO2013/031096
PCT Pub. Date: Mar. 7, 2013

(65) Prior Publication Data
US 2013/0195359 A1    Aug. 1, 2013

(30) Foreign Application Priority Data

Aug. 29, 2011    (JP) .................................. 2011-186324

(51) Int. Cl.
*G06K 9/34* (2006.01)
*G06T 7/00* (2006.01)
(Continued)

(52) U.S. Cl.
CPC ............. *G06T 7/0083* (2013.01); *G06T 7/0048* (2013.01); *G06T 7/0081* (2013.01); *G06T 2207/10024* (2013.01); *G06T 2207/20021* (2013.01); *G06T 2207/20144* (2013.01); *G06T 2207/30201* (2013.01); *G06K 9/3241* (2013.01);
*G06K 9/34* (2013.01); *G06K 9/6223* (2013.01); *H04N 1/3876* (2013.01)

(58) Field of Classification Search
USPC ......... 382/104, 106, 113, 118, 171, 181, 190, 382/224, 225, 284, 291; 340/903; 345/425.5, 440; 701/28, 41, 523; 707/E17.009; 715/236, 719; 719/310; 709/238
See application file for complete search history.

(56) References Cited

U.S. PATENT DOCUMENTS 7,765,468 B2 *  7/2010  Munetsugu et al. .......... 715/236
8,238,672 B2 *  8/2012  Choi et al. .................... 382/225
(Continued)

FOREIGN PATENT DOCUMENTS

JP          2001-307122          11/2001    .............. G06T 11/80
JP          2003-69846           3/2003     ............... H04N 1/60
(Continued)

OTHER PUBLICATIONS

International Search Report issued Sep. 4, 2012 in International (PCT) Application No. PCT/JP2012/004992.
(Continued)

*Primary Examiner* — Anh Do
(74) *Attorney, Agent, or Firm* — Wenderoth, Lind & Ponack, L.L.P.

(57) ABSTRACT

Segments included in an image I are each classified as one of object (i.e., person) segments OS1 and OS2 and foreground segments FS1 and FS2. With respect to each of the foreground segments FS1 and FS2, an importance degree is calculated based on a composition of the image I and relations between the foreground segment of the image I and a foreground segment of an image other than the image I.

20 Claims, 43 Drawing Sheets

(51) Int. Cl.
*G06K 9/32* (2006.01)
*G06K 9/62* (2006.01)
*H04N 1/387* (2006.01)

(56) References Cited

U.S. PATENT DOCUMENTS

2003/0053689 A1 3/2003 Watanabe et al. ............ 382/167
2005/0134946 A1 6/2005 Tsue et al. .................... 358/452

FOREIGN PATENT DOCUMENTS

| JP | 2005-122501 | 5/2005 | ............ G06T 17/40 |
| JP | 2006-67521 | 3/2006 | ............ H04N 1/409 |
| JP | 2007-214781 | 8/2007 | ............ H04N 1/38 |
| JP | 2007-310805 | 11/2007 | ............ G08G 1/16 |
| JP | 2008-257127 | 10/2008 | ............ G09G 5/36 |
| JP | 2008-306583 | 12/2008 | ............ H04N 1/387 |
| JP | 2009-151858 | 7/2009 | ............ G11B 23/40 |
| JP | 4315344 | 8/2009 | ............ H04N 1/387 |

OTHER PUBLICATIONS

Kazuhiro Hotta et al., "Face Recognition Using Weighted Matching by Information of Gabor Features", The Institute of Electronics, Information and Communication Engineers, Technical Report of IEICE, HIP2000-5 (May 2000) along with English translation.

John C. Platt et al., "PhotoTOC: Automatic Clustering for Browsing Personal Photographs", Fourth IEEE Pacific Rim Conference on Multimedia (2003).

Laurent Itti et al., "A Model of Saliency-based Visual Attention for Rapid Scene Analysis", PAMI 20 (1998) 1254-1259.

Yizong Cheng, "Mean Shift, Mode Seeking, and Clustering", IEEE Transactions on Pattern Analysis and Machine Intelligence, vol. 17, No. 8, Aug. 1995, pp. 790-799.

Michael J. Swain et al., "Color Indexing", International Journal of Computer Vision, 7:1, pp. 11-32 (1991).

\* cited by examiner

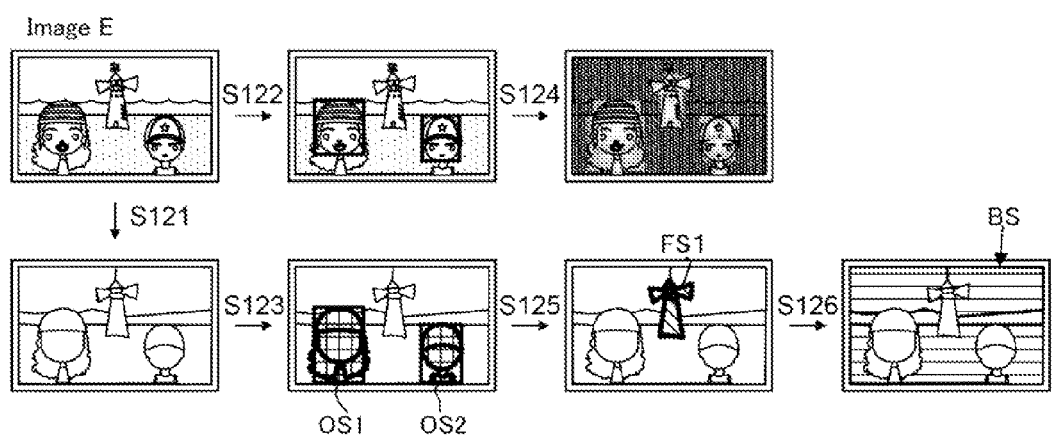
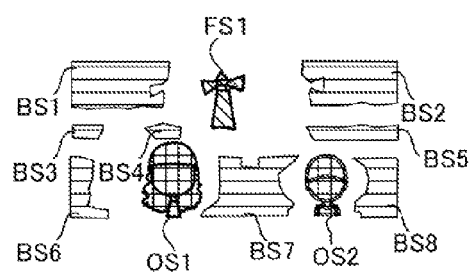
FIG. 12

FIG.13

| Image ID | Segment classification | Segment ID | Segment information |
|---|---|---|---|
| A | Object | ... | (1,1),(1,2),(1,3),(2,1),(2,2),(2,3) |
| ... | ... | ... | ... |
| E | Object | OS1 | (1,1),(1,2),(1,3),(2,1),(2,2),(2,3) |
| E | Object | OS2 | (1,1),(1,2),(1,3),(2,1),(2,2),(2,3) |
| E | Foreground | FS1 | (1,1),(1,2),(1,3),(2,1),(2,2),(2,3) |
| E | Background | BS1 | (1,1),(1,2),(1,3),(2,1),(2,2),(2,3) |
| E | Background | BS2 | (1,1),(1,2),(1,3),(2,1),(2,2),(2,3) |
| E | Background | BS3 | (1,1),(1,2),(1,3),(2,1),(2,2),(2,3) |
| E | Background | BS4 | (1,1),(1,2),(1,3),(2,1),(2,2),(2,3) |
| E | Background | BS5 | (1,1),(1,2),(1,3),(2,1),(2,2),(2,3) |
| E | Background | BS6 | (1,1),(1,2),(1,3),(2,1),(2,2),(2,3) |
| E | Background | BS7 | (1,1),(1,2),(1,3),(2,1),(2,2),(2,3) |
| E | Background | BS8 | (1,1),(1,2),(1,3),(2,1),(2,2),(2,3) |
| ... | ... | ... | ... |

73 Segment cluster information storage unit

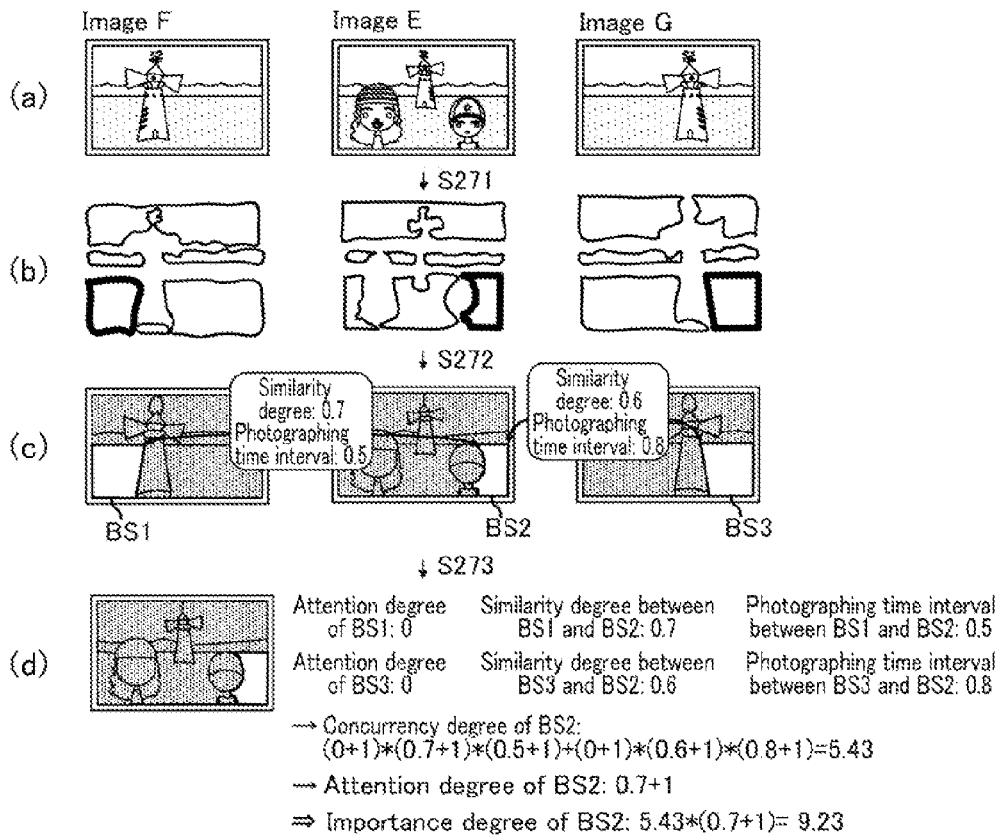

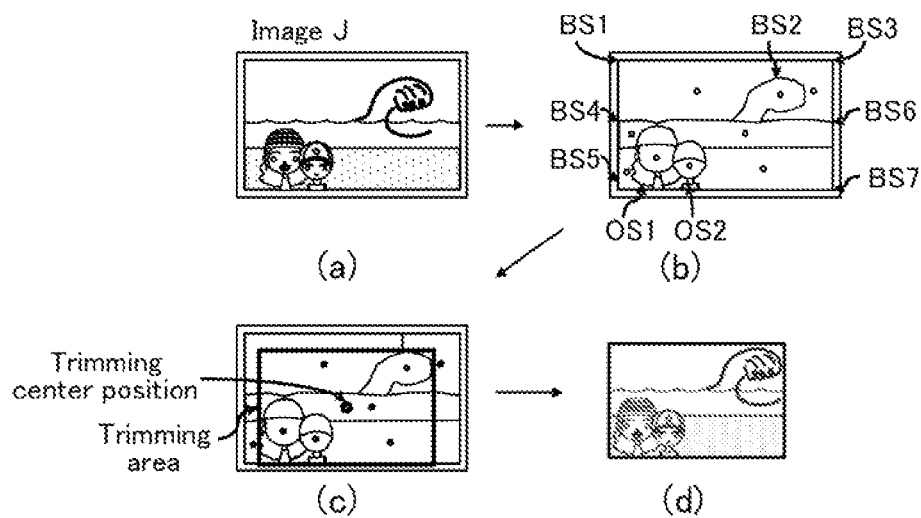

FIG.36

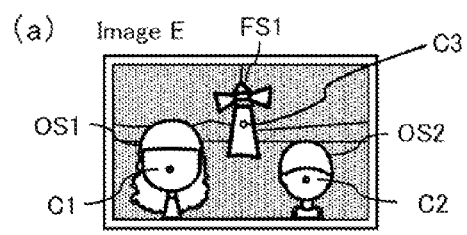

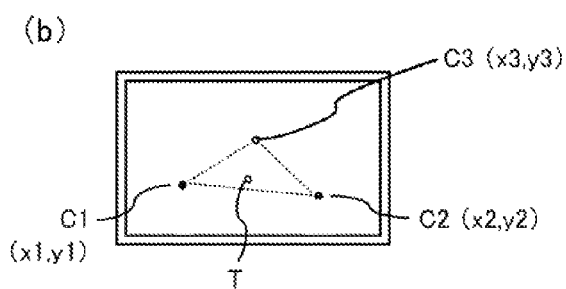

(c)

Trimming center position T

X coordinate = [(Importance degree of OS1 * x1) + (Importance degree of OS2 * x2) + (Importance degree of OS3 * x3)] / [(Importance degree of OS1) + (Importance degree of OS2) + (Importance degree of OS3)]

Y coordinate = [(Importance degree of OS1 * y1) + (Importance degree of OS2 * y2) + (Importance degree of OS3 * y3)] / [(Importance degree of OS1) + (Importance degree of OS2) + (Importance degree of OS3)]

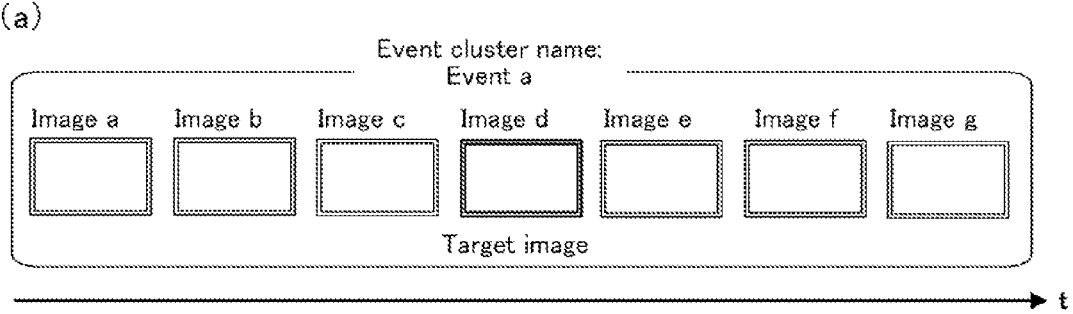

(b)
First method: With use of target image and all images other than target image

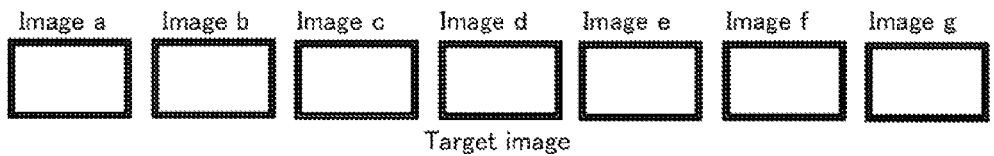

(c)
Second method: With use of target image and images each having predetermined or less photographing time interval from target image

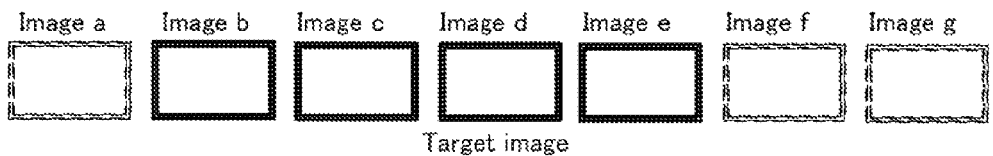

(d)
Third method: With use of target image and images each having predetermined or higher similarity degree with target image in terms of foreground segment or background segment

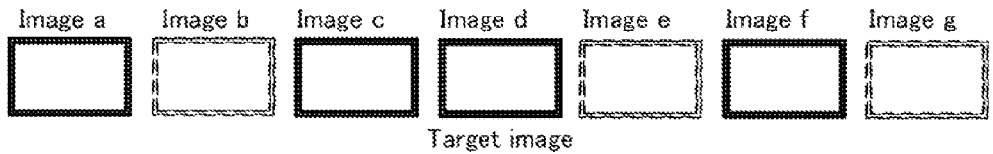

FIG.39
(a)
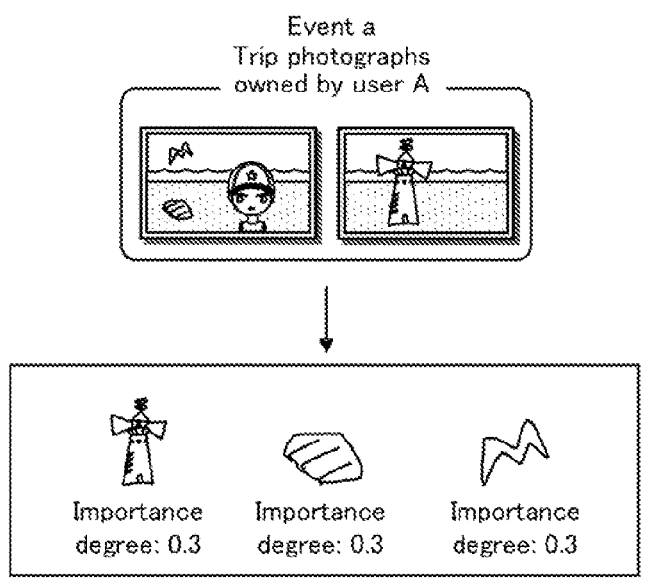
(b)
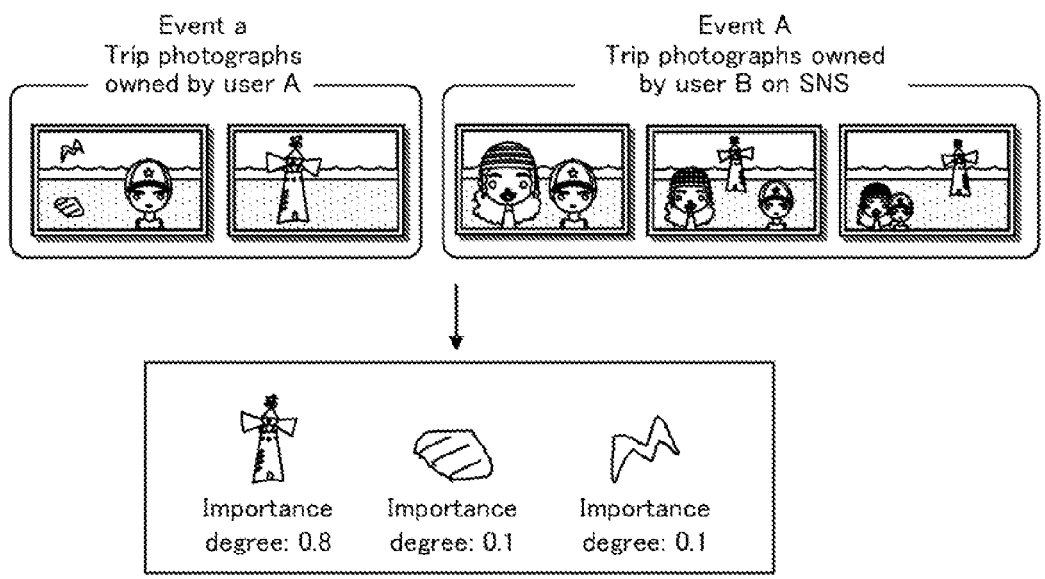

FIG.49

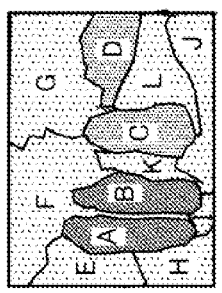

With respect to image X including segments A to L, XY coordinates of trimming center in image X is calculated by equations shown below for calculating center of gravity with use of importance degree of segment and weighting coefficient of segment "Weighting coefficient of segment" is the number of touch operations (designations) made on segment by user Trimming center (X coordinate) in image X = Weighting coefficient of segment A × Importance degree of segment A × X coordinate of center of gravity of segment A + Weighting coefficient of segment B × Importance degree of segment B × X coordinate of center of gravity of segment B + ⋯ + Weighting coefficient of segment L × Importance degree of segment L × X coordinate of center of gravity of segment L Trimming center (Y coordinate) in image X = Weighting coefficient of segment A × Importance degree of segment A × Y coordinate of center of gravity of segment A + Weighting coefficient of segment B × Importance degree of segment B × Y Coordinate of center of gravity of segment B + ⋯ + Weighting coefficient of segment L × Importance degree of segment L × Y coordinate of center of gravity of segment L Weighting coefficient of segment i = The number of operations user made on segment i

FIG.50

With respect to image P,
XY coordinates of trimming center in image P is calculated by equations shown below for calculating center of gravity with use of importance degree of segment and weighting coefficient of segment

[Equations]

$$TrimCoordinate_x(p) = \frac{\sum_i Sw(i) \times Svalue(i) \times Scoordinate_x(i)}{\sum_i Sw(i) \times Svalue(i)}$$

$$TrimCoordinate_y(p) = \frac{\sum_i Sw(i) \times Svalue(i) \times Scoordinate_y(i)}{\sum_i Sw(i) \times Svalue(i)}$$

TrimCoordinate(p) : Position of trimming center (XY coordinates) in image P
Sw(i) : Weighting coefficient of segment i in image P
Svalue(i) : Importance degree of segment i in image P
SCoordinate(i) : Position of center of gravity (XY coordinates) of segment i in image P

FIG.54

With respect to image X including segments A to L,
XY coordinates of trimming center in image X is calculated by equations shown below for calculating center of gravity with use of importance degree of segment and weighting coefficient of segment In accordance with type of segment written in trimming condition contained in template, "weighting coefficient of segment" is substituted with weighting coefficient written in trimming condition

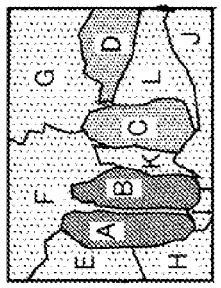

Trimming center (X coordinate) in image X =

(Weighting coefficient of segment A × Importance degree of segment A × X coordinate of center of gravity of segment A + Weighting coefficient of segment B × Importance degree of segment B × X Coordinate of center of gravity of segment B + ⋯ + Weighting coefficient of segment L × Importance degree of segment L × X coordinate of center of gravity of segment L) / (Weighting coefficient of segment A × Importance degree of segment A + Weighting coefficient of segment B × Importance degree of segment B + ⋯ + Weighting coefficient of segment L × Importance degree of segment L)

Trimming center (Y coordinate) in image X =

(Weighting coefficient of segment A × Importance degree of segment A × Y coordinate of center of gravity of segment A + Weighting coefficient of segment B × Importance degree of segment B × Y Coordinate of center of gravity of segment B + ⋯ + Weighting coefficient of segment L × Importance degree of segment L × Y coordinate of center of gravity of segment L) / (Weighting coefficient of segment A × Importance degree of segment A + Weighting coefficient of segment B × Importance degree of segment B + ⋯ + Weighting coefficient of segment L × Importance degree of segment L)

Weighting coefficient of segment i = Weighting coefficient substituted with in accordance with type of segment written in trimming condition contained in template

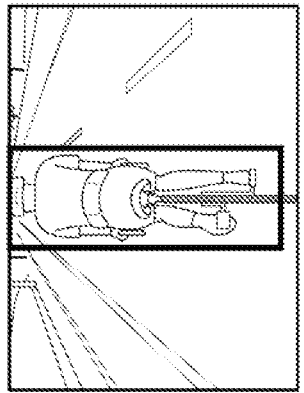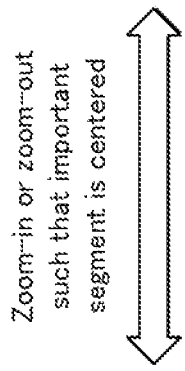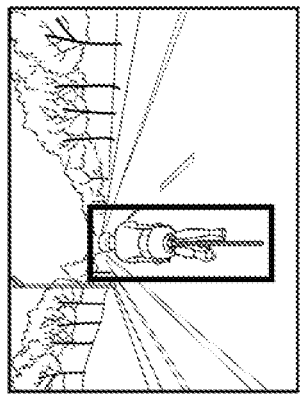
FIG.56A
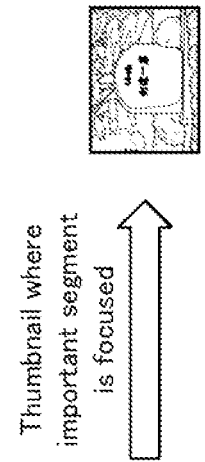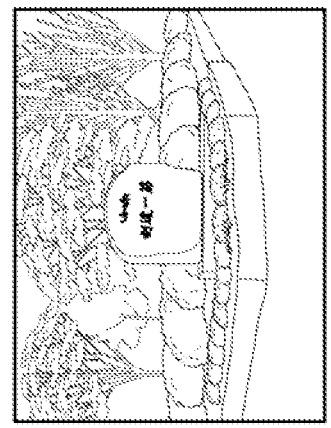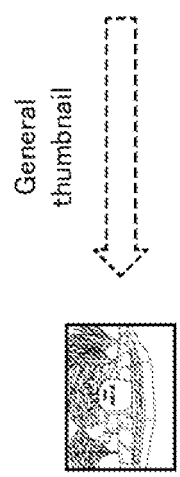
FIG.56B

IMAGE PROCESSING DEVICE, IMAGE PROCESSING METHOD, PROGRAM, AND INTEGRATED CIRCUIT

TECHNICAL FIELD

The present invention relates to an image processing device for specifying an area that is estimated to be important for a user among areas included in an image.

BACKGROUND ART

In recent years, an environment has been established where users can easily photograph images due to the popularization of digital cameras and the increase in capacity of storage media.

Actually, there is often the case where when the user checks a photographed image afterwards, the user finds that an unnecessary part is included in the image. The user hopes to cut out only a necessary part from the image. Also, there is a case where when a user creates an album, the user needs to cut out a part from an image in accordance with the shape and the size of a frame of the album such that the image is placed within the frame.

As an art relating to image cut-out, there has been an art of cutting out, from an image, a part including a face of a person or a part including the face and a neck of the person, in order to create a face photograph as an identification photograph (see Patent Literature 1).

CITATION LIST

Patent Literature

[Patent Literature 1] Japanese Patent Application Publication No. 2001-307122
[Patent Literature 2] Japanese Patent Application Publication No. 4315344

Non-Patent Literature

[Non-Patent Literature 1] Kazuhiro Hotta (Saitama University, (Research Fellow of Japan Society for the Promotion of Science)), Face Recognition Using Weighted Matching by Information of Gabor Features, Technical Report of the Institute of Electronics, Information and Communication Engineers, HIP, Human Information Processing, 100(34), pp. 31-38, 20000504
[Non-Patent Literature 2] John C. Platt, Mary Czerwinski, Brent A. Field, Photo TOC: Automatic Clustering for Browsing Personal Photographs, Fourth IEEE, Pacific Rim Conference on Multimedia (2003)
[Non-Patent Literature 3] Itti, L., Koch, C., and Niebur, E., A Model of Saliency-based Visual Attention for Rapid Scene Analysis, PAMI 20 (1998) 1254-1259
[Non-Patent Literature 4] Y. Cheng, Mean Shift, Mode Seeking, and Clustering, IEEE Trans. Pattern Anal and Machine Intell., 17(8): 790-799, 1995
[Non-Patent Literature 5] Swain, M. J. and Ballard, D. H., Color Indexing, IJCV, 7, pp. 11-32 (1991)

SUMMARY OF INVENTION

Technical Problem

Actually, what the user regards as important in an image often includes not only a person but also an object. It is true that conventional face recognition technology provides a precision with a predetermined level. However, object recognition technology for recognizing generic objects other than faces provide an insufficient precision and robustness.

For this reason, there might occur a case where when an area is cut out from an image where family members and a tower appear for example, while a part including the family members is recognizable, a part including the tower that is an object is unrecognizable. Therefore, it is difficult to cut the area where both the family members and the tower appear from the image by relying on only the object recognition technology.

The present invention was made in view of the above problem, and aims to provide an image processing device capable of specifying an area that is estimated to be important for a user among areas included in an image without entirely relying on only the object recognition technology.

Solution to Problem

In order to solve the above problem, an image processing device relating to the present invention comprises: a division unit configured to divide each of a plurality of images into a plurality of segments; and a calculation unit configured to calculate a segment importance degree of each of the segments divided from one of the plurality of images, based on relations between the segment and other of the segments divided from the one image or relations between the segment and any of the segments divided from each of one or more predetermined images among the plurality of images.

Advantageous Effects of Invention

The image processing device relating to the present invention contributes to specification of an area that is estimated to be important for a user among areas included in an image, and accordingly is appropriately used for trimming an area, for example.

BRIEF DESCRIPTION OF THE DRAWINGS

FIG. 12 is an image diagram showing a specific example of segment clustering.
FIG. 13 shows the data structure of segment cluster information.

FIG. 27 is an image diagram showing a specific example of calculation of segment importance degrees of background segments.

FIG. 28 shows the data structure of a segment importance degree.

FIG. 34 is an image diagram showing a specific example of calculation of trimming area by a zoom-out trimming method.

FIG. 35 shows the data structure of trimming information.

FIG. 36 is an image diagram showing a specific example of calculation of the trimming center position.

FIG. 37 is an image diagram showing a specific example of selection of images for use in calculating segment importance degrees of foreground segments and background segments.

FIG. 39 shows the outline of Embodiment 2.

FIG. 49 shows an example of calculation of the trimming center position.

FIG. 50 shows an example of calculation of the trimming center position.

FIG. 54 shows an example of calculation of the trimming center position.

FIG. 56A shows an example of zoom-in and zoom-out, and FIG. 56B shows an example of thumbnail creation.

DESCRIPTION OF EMBODIMENTS

The following describes embodiments of the present invention with reference to the drawings.

Embodiment 1

Structure

Embodiment 1 relates to an art of, with respect to an image group of images photographed by a user at an event such a travel, dividing each of the images into several segments, calculating an importance degree indicating evaluation for each of the segments based on a feature of the image and features of images anterior and posterior to the image, and cutting out an area from the image based on the calculated importance degree.

Figure 1:
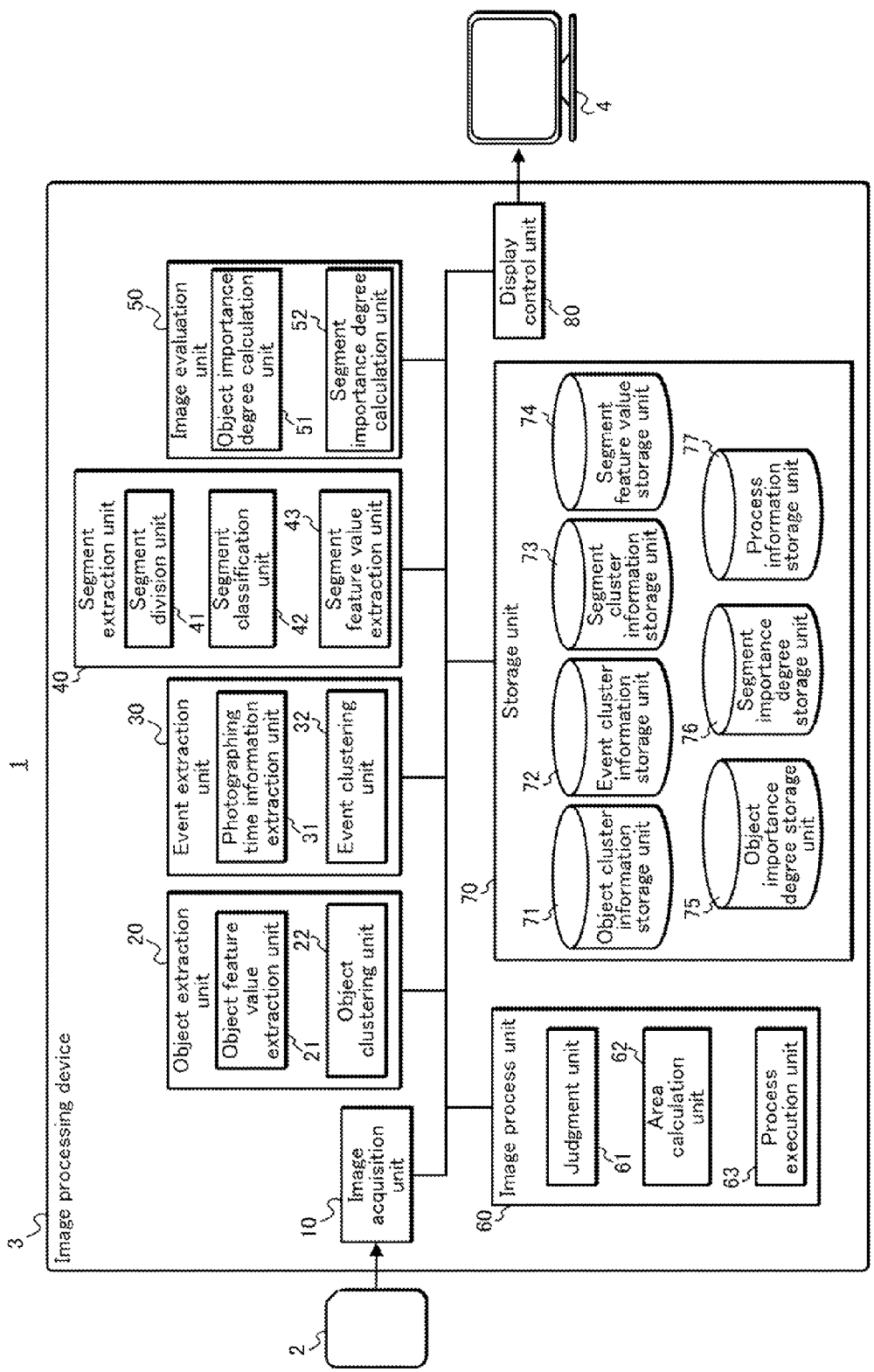
FIG. 1 is a block diagram showing an image processing system.

FIG. 1 is a block diagram showing the principal structure of an image processing system 1 relating to Embodiment 1.

The image processing system 1 includes a storage medium 2, an image processing device 3, and a display 4.

The image processing device 3 includes an image acquisition unit 10, an object extraction unit 20, an event extraction unit 30, a segment extraction unit 40, an image evaluation unit 50, an image process unit 60, a storage unit 70, and a display control unit 80. The object extraction unit 20 includes an object feature value extraction unit 21 and an object clustering unit 22. The event extraction unit 30 includes a photographing time information extraction unit 31 and an event clustering unit 32. The segment extraction unit 40 includes a segment division unit 41, a segment classification unit 42, and a segment feature value extraction unit 43. The image evaluation unit 50 includes an object importance degree calculation unit 51 and a segment importance degree calculation unit 52. The image process unit 60 includes a judgment unit 61, an area calculation unit 62, and a process execution unit 63. The storage unit 70 includes an object cluster information storage unit 71, an event cluster information storage unit 72, a segment cluster information storage unit 73, a segment feature value storage unit 74, an object importance degree storage unit 75, a segment importance degree storage unit 76, and a process information storage unit 77.

Here, only the outline of each of the above blocks is described. The details of the blocks are described later with reference to FIG. 2 and subsequent drawings.

The image acquisition unit 10 is for example an SD card reader, and acquires image data from the storage medium 2 such as an SD memory card inserted into an SD card slot.

The object feature value extraction unit 21 extracts an object feature value of an object appearing in an image represented by image data acquired by the image acquisition unit 10. One example of methods of extracting object feature values from images is the extraction method involving the use of the Gabor filter (see Non-Patent Literature 1). Note that in the following, description is provided under the premise that each object is a human face.

The object clustering unit 22 performs object clustering based on the extracted feature value to extract object cluster information, and stores the object cluster information into the object cluster information storage unit 71. One example of methods of performing object clustering is the k-means clustering method (see Non-Patent Literature 1). The k-means clustering method is one type of non-hierarchical clustering methods (a non-hierarchical clustering method refers to a clustering method where clustering is performed by associating each fixed cluster with a cluster representative).

The photographing time information extraction unit 31 extracts photographing time information to be appended to an image represented by image data acquired by the image acquisition unit 10.

Also, the event clustering unit 32 performs event clustering based on the extracted photographing time information to extract event cluster information, and stores the extracted event cluster information into the event cluster information storage unit 72. One example of methods of performing event clustering is a method of setting a given time period as a threshold value and determining a breakpoint between two events when a difference between photographing times of two images exceeds the threshold value (see Non-Patent Literature 2).

The segment division unit 41 extracts a feature value of an image represented by image data acquired by the image acquisition unit 10, and divides (i.e., segments) the image into a plurality of segments (i.e., areas) based on the extracted feature value. One example of methods of dividing an image into segments is the image division method with use of the mean algorithm (see Non-Patent Literature 4).

The segment feature value extraction unit 43 extracts a foreground feature value of the image. The foreground feature value is extracted with use of at least one of color information, brightness information, edge direction information, depth information, and so on with respect to the image. One example of methods of extracting the foreground feature value is the foreground extraction method with use of saliency map (see Non-Patent Literature 3).

The segment classification unit 42 classifies each of the segments as any one of the following three types of segments as shown below, with use of the extracted foreground feature value and the object cluster information extracted by the object extraction unit 20.

A part where a person who appears in the image is classified as an object segment.

A part where an object that is a subject other than a person who appears in the image is classified as a foreground segment.

A remaining part other than the person and the object that appear in the image is classified as a background segment.

Then, the segment classification unit 42 stores segment cluster information indicating classification results into the segment cluster information storage unit 73.

The segment feature value extraction unit 43 extracts a segment feature value indicating a feature of each of the classified segments, and stores information indicating the extracted segment feature value into the segment feature value storage unit 74. One example of methods of extracting segment feature values is a method of dividing each segment into a plurality of sections, extracting a color feature that appears most frequently in each section as a representative color of the section, creating a histogram indicating the representative colors of the sections, and determining the histogram as the segment feature value of the segment. The color histogram is detailed in Non-Patent Literature 5.

The object importance degree calculation unit 51 calculates an object importance degree indicating an importance degree of each object such as a person appearing in an image based on the object cluster information stored in the object cluster information storage unit 71. Then, the object importance degree calculation unit 51 stores information indicating the calculated object importance degree into the object importance degree information storage unit 75.

The segment importance degree calculation unit 52 calculates, for each segment, a segment importance degree based on the respective pieces of information stored in the storage units 71 to 74 by a method depending on the type of the classified segment. Then, the segment importance degree calculation unit 52 stores the calculated segment importance degree into the segment importance degree storage unit 76.

The image process unit 60 performs process such that an attention is paid to a particular area in the image. In the present embodiment, the process is trimming.

The judgment unit 61 judges which one of two available types of trimming methods, specifically the zoom-in trimming method and the zoom-out trimming method, is to be used.

The area calculation unit 62 calculates an area to be cut out from the image based on the type and importance degree of each segment included in the image with use of the judged trimming method, and stores information indicating the calculated area into the process information storage unit 77.

The process execution unit 63 trims the calculated area from the image.

The storage unit 70 includes the storage units 71 to 77, and is for example a RAM.

The display control unit 80 performs display control on the display 4.

<Operations>

The following describes the entire flow of image trimming.

Figure 2:
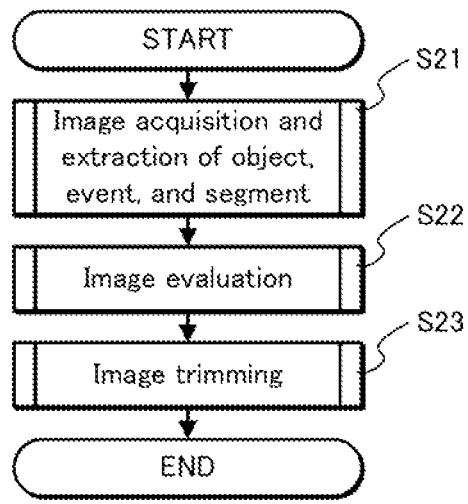
FIG. 2 is a flowchart showing the entire flow.

As shown in FIG. 2, the image processing device 3 performs image acquisition, object extraction, event extraction, and segment extraction (Step S21), and then performs image evaluation (Step S22), and finally performs image trimming (Step S23).

Figure 3:
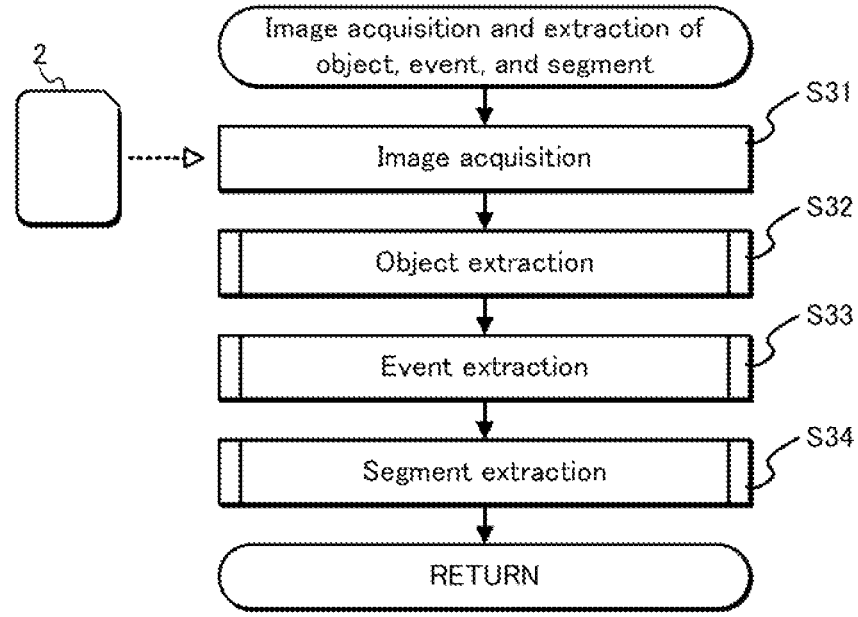
FIG. 3 is a flowchart showing operations of image acquisition, object extraction, event extraction, and segment extraction.

The following describes processing of image acquisition, object extraction, event extraction, and segment extraction (Step S21), with reference to FIG. 3.

As shown in FIG. 3, in processing of image acquisition, object extraction, event extraction, and segment extraction, the image acquisition unit 10 acquires image data stored in the storage medium 2 (Step S31).

Then, the object extraction unit 20 extracts an object that is a person from an image represented by the acquired image data (Step S32).

The event extraction unit 30 extracts an event to which the image represented by the acquired image data belongs (Step S33).

The segment extraction unit 40 extracts segments divided from the image represented by the acquired image data (Step S34).

Figure 4:
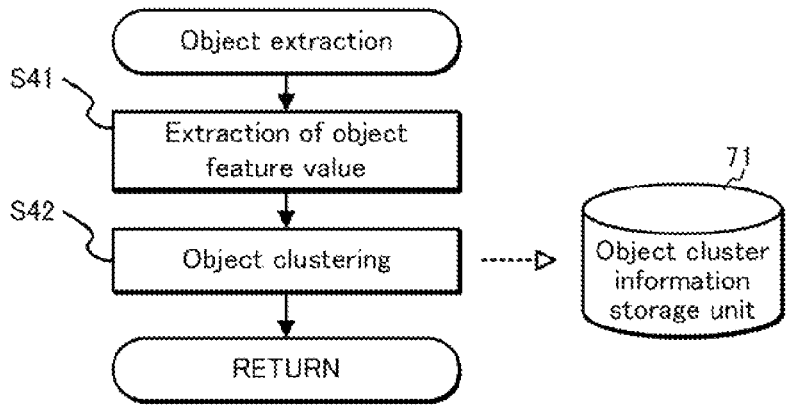
FIG. 4 is a flowchart showing operations of object extraction.

The following describes the object extraction processing (Step S32) with reference to FIG. 4. The object feature value extraction unit 21 cuts out an area where a human face appears in the image, and extracts a face feature value indicating the position, the size, and so on of the human face (Step S41). Next, the object clustering unit 22 performs object clustering with use of the extracted face feature value, and stores object cluster information resulting from the object clustering into the object cluster information storage unit 71 (Step S42).

Figure 5:
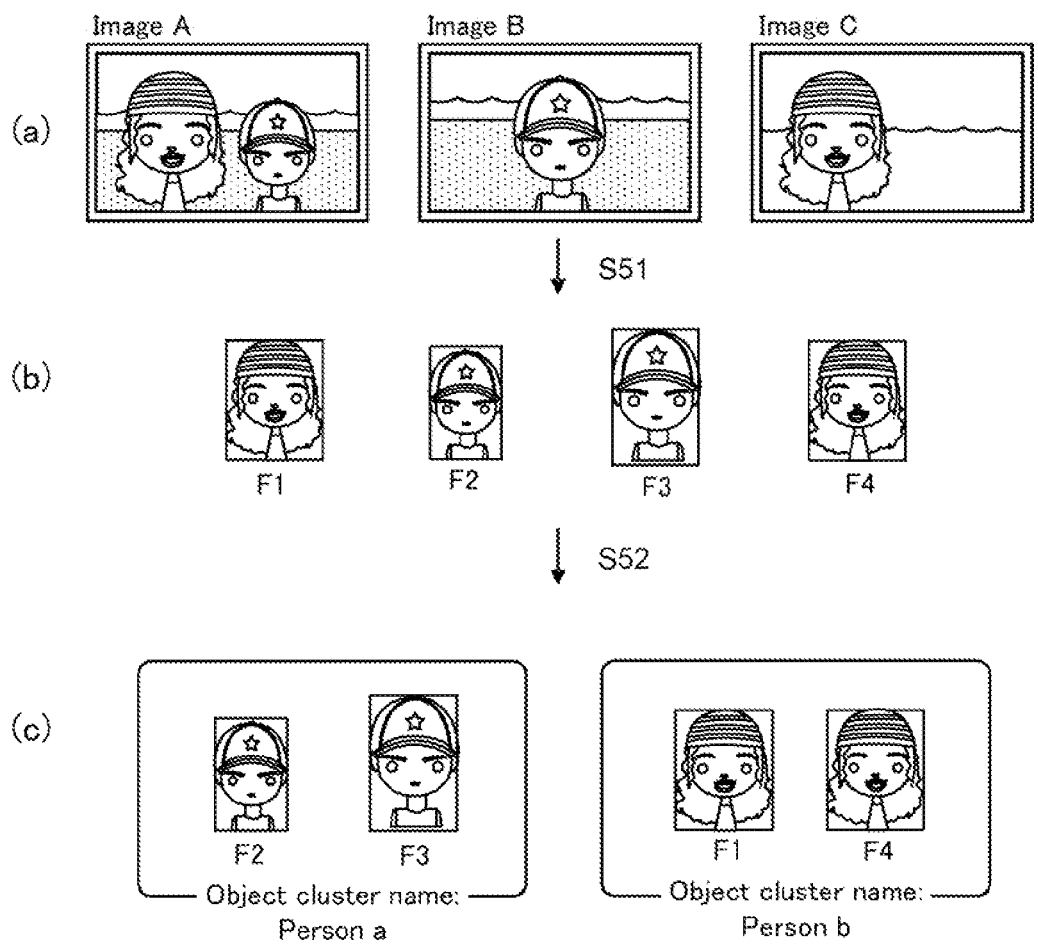
FIG. 5 is an image diagram showing a specific example of person clustering.

The following specifically describes the operations of Steps S41 and S42 with reference to FIG. 5.

The object feature value extraction unit 21 cuts out four faces F1 to F4 from three images A to C (portion (a) of FIG. 5) (Step S51). The object feature value extraction unit 21 extracts a feature value of each of the faces F1 to F4 (portion (b) of FIG. 5).

Subsequently, the object clustering unit 22 clusters, among the four faces F1 to F4, the faces F2 and F3 which are similar into a person a, and clusters the faces F1 and F4 which are similar into a person b (portion (c) of FIG. 5) (Step S52).

Figure 6:
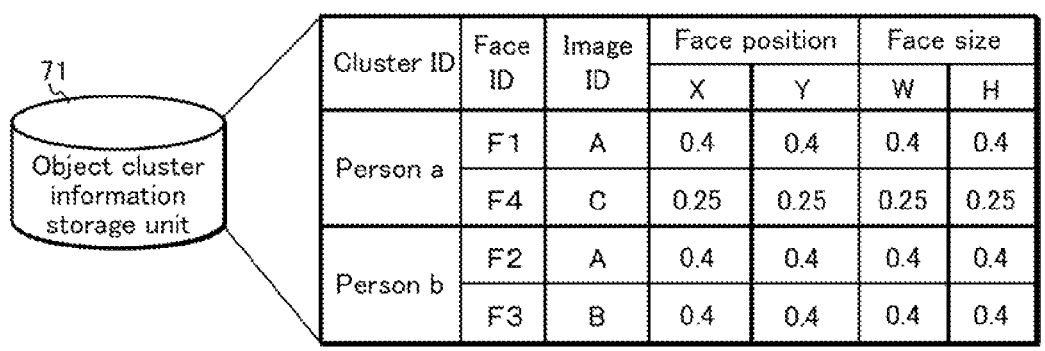
FIG. 6 shows the data structure of object cluster information.

FIG. 6 shows the data structure of the object cluster information indicating results of the object clustering (Step S42). The object cluster information is information indicating which person cluster each of the faces appearing in the images belongs to, and includes items such as "Cluster ID", "Face ID", "Image ID", "Face position (X,Y)", and "Face size (W,H)".

Figure 7:
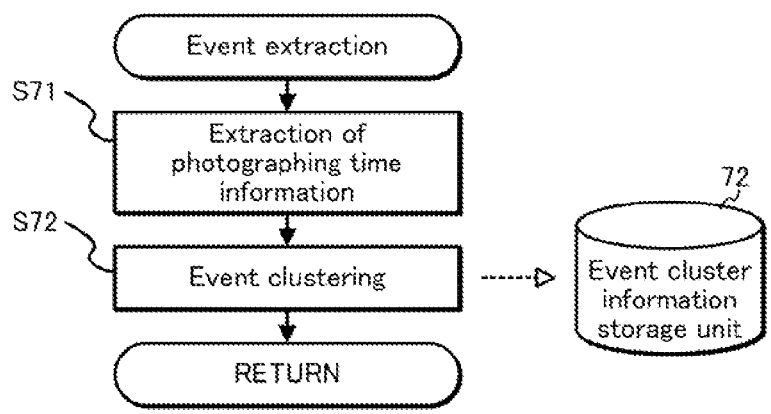
FIG. 7 is a flowchart showing operations of event extraction.

The following describes the event extraction processing (Step S33) with reference to FIG. 7. The photographing time information extraction unit 31 extracts photographing time information appended to the image at a photographing time of the image (Step S71). Subsequently, the event clustering unit 32 performs event clustering with use of the extracted photographing time information, and stores event cluster information resulting from the event clustering into the event cluster information storage unit 72 (Step S72).

Figure 8:
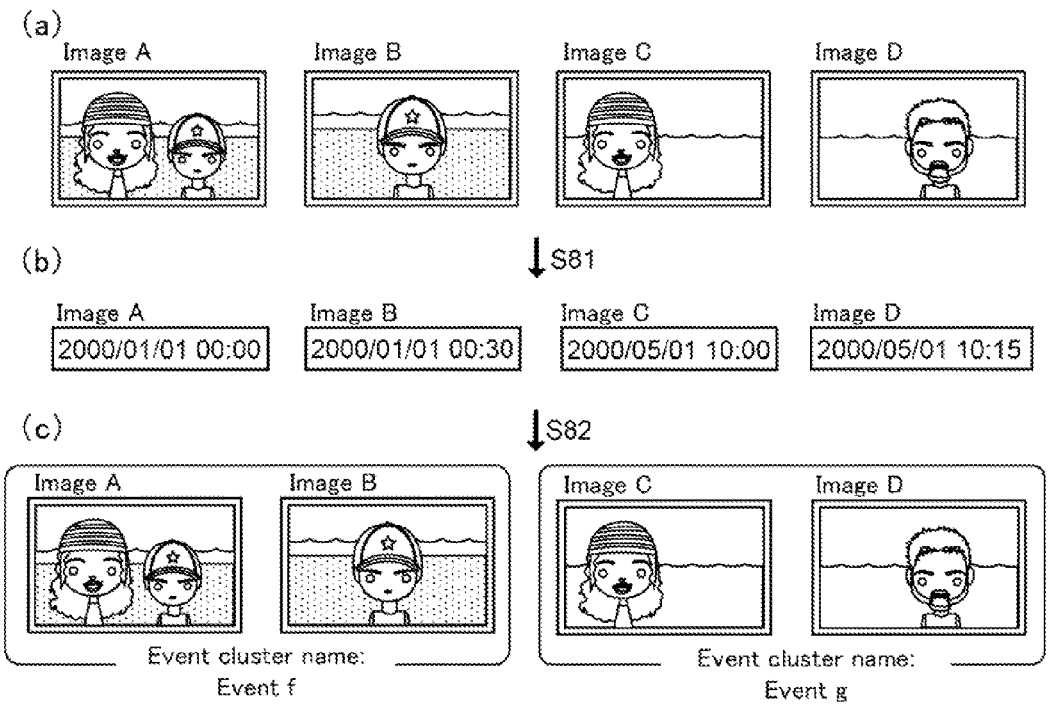
FIG. 8 is an image diagram showing a specific example of event clustering.

The following specifically describes the operations of Steps S71 and S72 with reference to FIG. 8. The photographing time information extraction unit 31 extracts, from each of four images A to D (portion (a) of FIG. 8), a photographing time of the image (portion (b) of FIG. 8) (Step S81). The photographing time is extracted for example from Exif (Exchangeable image file format) information appended to an image photographed by a digital camera or the like. The event clustering unit 32 clusters, among the four images, the images A and B whose photographing times are close into an event f, and clusters the images C and D whose photographing times are close into an event g (portion (c) of FIG. 8) (Step S82).

Figure 9:
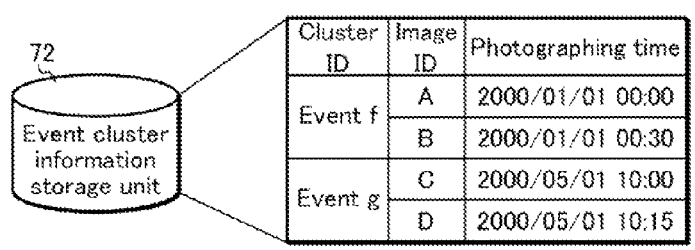
FIG. 9 shows the data structure of event cluster information.

FIG. 9 shows the data structure of the event cluster information indicating results of the event clustering (Step S72). The event cluster information indicates which event cluster each image belongs to, and includes items such as "Cluster ID", "Image ID", and "Photographing time".

Figure 10:
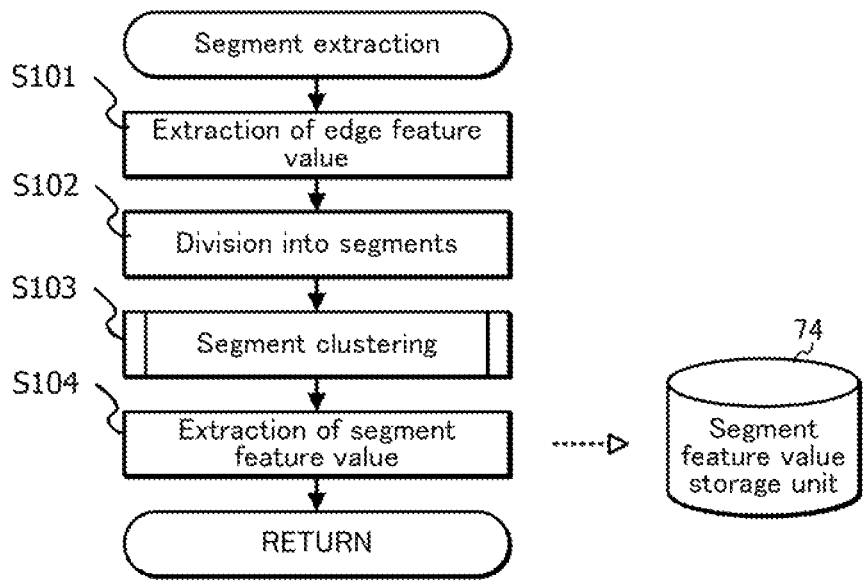
FIG. 10 is a flowchart showing operations of segment extraction.

The following describes in detail the segment extraction processing (Step S34) with reference to FIG. 10. The segment division unit 41 extracts an edge feature value of the image (Step S101), and divides the image into a plurality of segments (i.e., areas) based on the extracted edge feature value (Step S102). Then, the segment classification unit 42 classifies each of the segments as any one of the three types of an object segment, a foreground segment, and a background segment (Step S103). Then, the segment division unit 41 extracts a segment feature value of each of the classified segments, and stores the extracted segment feature value into the segment feature value storage unit 74 (Step S104).

Figure 11:
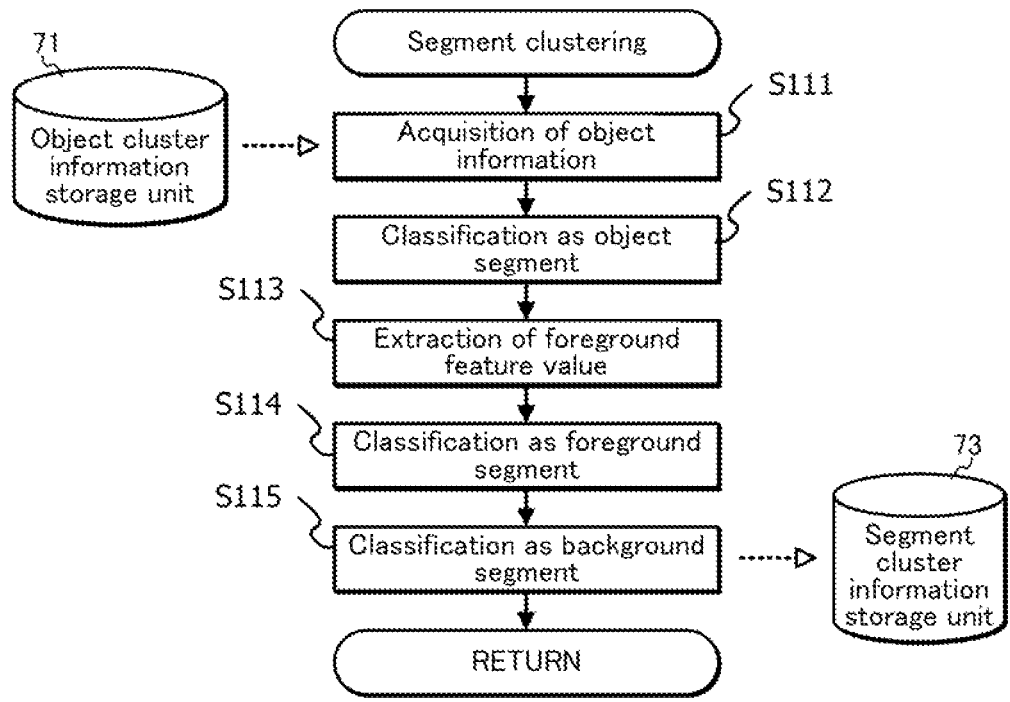
FIG. 11 is a flowchart showing operations of segment clustering.

The following describes the segment clustering processing (Step S103) with reference to FIG. 11. The segment classification unit 42 acquires object information from the object cluster information storage unit 71 (Step S111). Based on the position and the size of a face of a person who appears in the image indicated by the object information, the segment classification unit 42 estimates the position and the size of a body of the person, and estimates a range where the person with the face and the body appears in the image. Then, the segment classification unit 42 classifies an area included in the estimated range as an object segment (Step S112).

Then, the segment classification unit 42 extracts a foreground feature value of the image (Step S113), and classifies an area which has not been classified as an object segment and from which the foreground feature value is extracted, as a foreground segment (Step S114).

Finally, the segment classification unit 42 classifies an area which has not yet been classified, as a background segment representing a background. In this way, the segment classification unit 42 classifies each of the segments, which have been divided from the image, as any one of an object segment, a foreground segment, and a background segment, and then stores segment cluster information indicating results of the segment classification into the segment cluster information storage unit 73 (Step S115).

The following describes in detail the operations of Step S112 to S115 with use of an example of the image E shown in FIG. 12. The segment classification unit 42 extracts an edge feature value of the image E, and divides the image E into a plurality of segments (Step S121). Then, the segment classification unit 42 recognizes a human face appearing in the image E (Step S122). Based on the position and the size of the recognized human face, the segment classification unit 42 estimates a segment that includes an area where the human face and a human body appear among the segments divided from the image E, and classifies the estimated segment as an object segment (Step S123). In this example, the segment classification unit 42 classifies a segment that includes an area where a mother's face and body appear in the image E and a segment that includes an area where a son's face and body appear in the image E as object segments OS1 and OS2, respectively. Then, the segment classification unit 42 extracts a foreground feature value of the image E (Step S124). The image E in the upper right in the portion (a) of FIG. 12 is a saliency map and shows a situation where persons and a lighthouse are each extracted as a foreground with a whitish color.

Then, the segment classification unit 42 estimates a segment that includes a foreground among the segments of the image E based on the extracted foreground feature value, and classifies the estimated segment as a foreground segment (Step S125).

In this example of the image E, the two persons and the lighthouse appear as the foregrounds. However, the two segments including the foreground where the two persons appear have been already classified as the object segments OS1 and OS2, respectively. Accordingly, the segment classification unit 42 classifies the segment including the foreground where the lighthouse appears as a foreground segment FS1.

Then, the segment classification unit 42 classifies, as a background segment BS, a remaining segment which has not been classified as any of the object segments OS1 and OS2 and the foreground segment FS1 (Step S126). In the bottom right in portion (a) of FIG. 12, background segments are shown as the single background segment BS. Actually, as shown in portion (b) of FIG. 12, the background segment BS is divided into eight background segments BS1 to BS8.

FIG. 13 shows the data structure of the segment cluster information indicating results of the segment clustering (Step S103). The segment cluster information indicates which segment type each of the areas included in the image belongs to. The segment cluster information includes items such as "Image ID", "Segment classification" indicating the segment type, "Segment ID" for uniquely specifying the segment, and "Segment information" indicating the position and the size of the segment.

Figure 14:
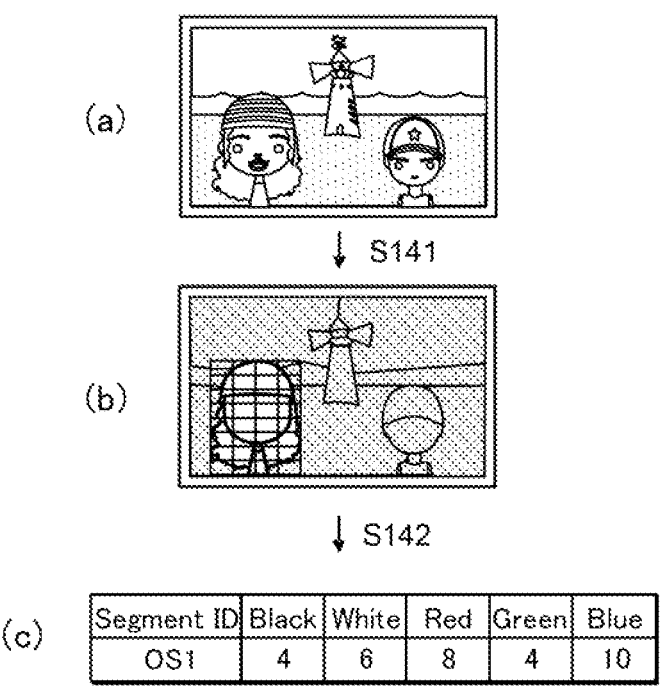
FIG. 14 is an image diagram showing a specific example of segment feature value extraction.

The following describes in detail the operations of Step S104 with reference to FIG. 14. The segment feature value extraction unit 43 specifies one of segments as an extraction target (Step S141), and divides an area included in the specified segment into sections in a grid pattern. Then, the segment feature value extraction unit 43 extracts a color that appears most frequently in each section as a representative color of the section, and calculates a histogram of the extracted representative colors of the sections as a segment feature value of the segment (Step S142). Here, the segment feature value extraction unit 43 specifies, as an extraction target, an object segment OS1 from an image E (portion (a) of FIG. 14). Then, the segment feature value extraction unit 43 divides the object segment OS1 into 32 sections, and calculates a histogram of representative colors including black, white, red, green, and blue in the 32 sections (portion (c) of FIG. 14). In this way, the segment feature value extraction unit 43 extracts a segment feature value of each of 11 segments OS1, OS2, FS1, and BS1 to BS8, which have been divided from the image E.

Figure 15:
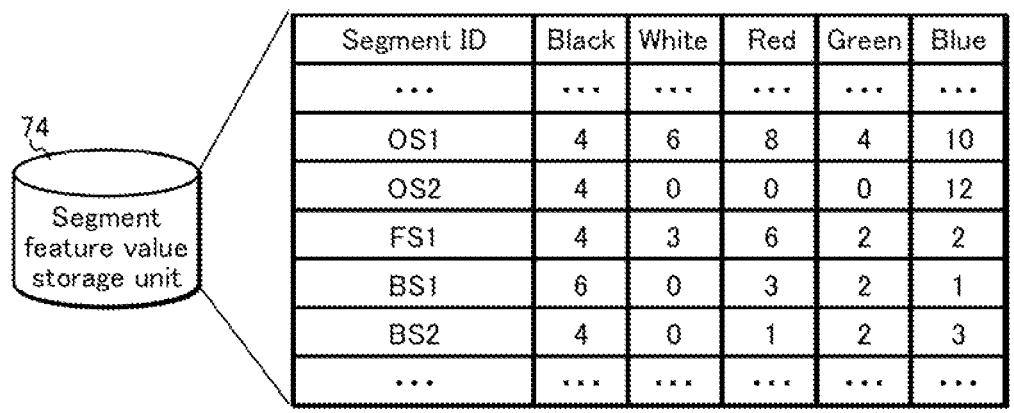
FIG. 15 shows the data structure of a segment feature value.

FIG. 15 shows the data structure of the segment feature value indicating results of the segment feature value extraction (Step S104). The segment feature value indicates color shade of each of the segments divided from the image, and includes items such as "Segment ID", "Black", "White", "Red", "Green", and "Blue".

Now, description is continued returning to FIG. 2. The following describes the image evaluation processing (Step S22) with reference to FIG. 16. The object importance degree calculation unit 51 calculates an object importance degree of each of objects appearing in an image (Step S161). Subsequently, the segment importance degree calculation unit 52 calculates a segment importance degree of each of segments divided from the image (Step S162).

Figure 17:
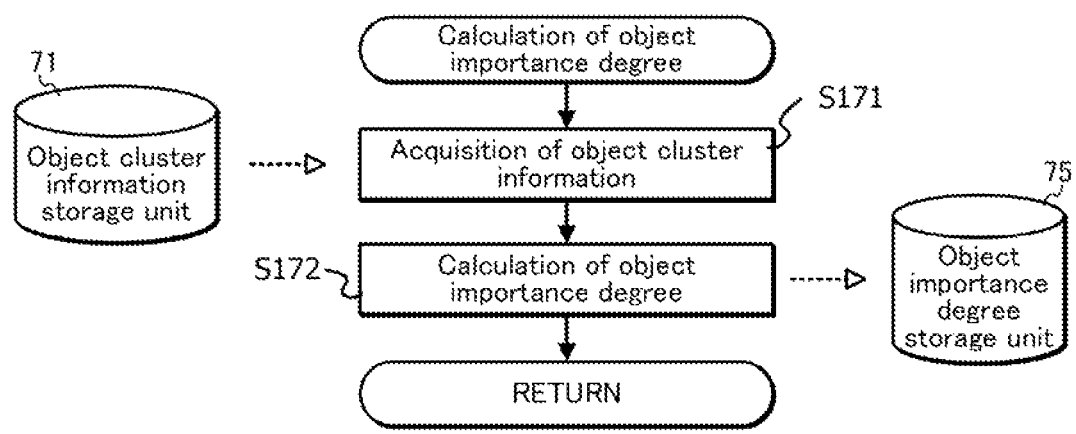
FIG. 17 is a flowchart showing operations of calculating object importance degrees.

The following describes the object importance degree calculation processing (Step S161) with reference to FIG. 17. The object importance degree calculation unit 51 acquires object cluster information from the object cluster information storage unit 71 (Step S171).

With respect to each object cluster, the object importance degree calculation unit 51 calculates [A] the number of images including a person indicated by an object cluster into which an object is clustered, based on the acquired object cluster information of the object cluster. Then, the object importance degree calculation unit 51 divides [A] the calculated number by [B] the total number of images included in an image group, i.e., ([A]/[B]) to calculate an appearance frequency of the person indicated by the object cluster as an object importance degree of the object. Then, the object importance degree calculation unit 51 stores the calculated object importance degree into the object importance degree storage unit 75 (Step S172).

In the case where a person X indicated by an object cluster appears in two images for example, the appearance frequency of the person X is two, and the object importance degree of an object representing the person X is also two. The appearance frequency and the object importance degree of the object are calculated taking into consideration of the tendency that a user frequently photographs an important object. A person appearing frequently in all the images included in the image group are regarded as important for the user.

Figure 18:
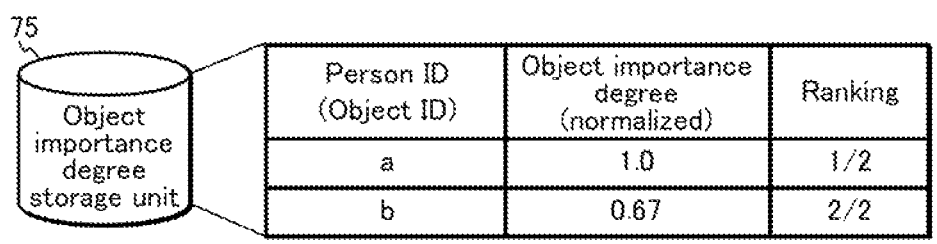
FIG. 18 shows the data structure of an object importance degree.

FIG. 18 shows the data structure of the object importance degree indicating results of the object importance degree calculation. The object importance degree indicates an importance degree of each of objects appearing in the image, and includes items of "Person ID", "Object importance degree", and "Ranking". In the example shown in FIG. 18, with respect to persons a and b appearing in an image, the object importance degree storage unit 75 stores therein object importance degrees of as 1.0 and 0.67, respectively, and respective ranks in accordance with the object importance degrees.

Figure 16:
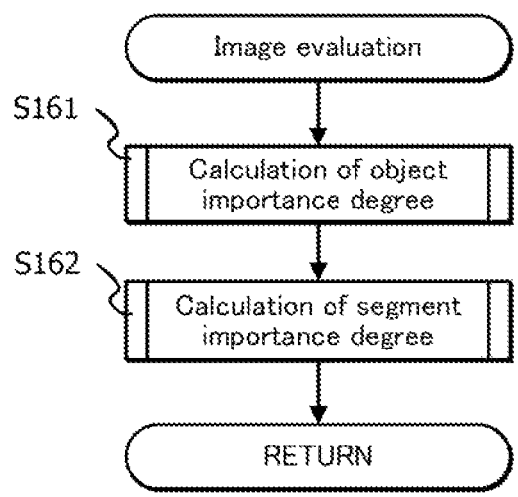
FIG. 16 is a flowchart showing operations of image evaluation.

The following describes in detail the segment importance degree calculation processing (Step S162) shown in FIG. 16.

Figure 19:
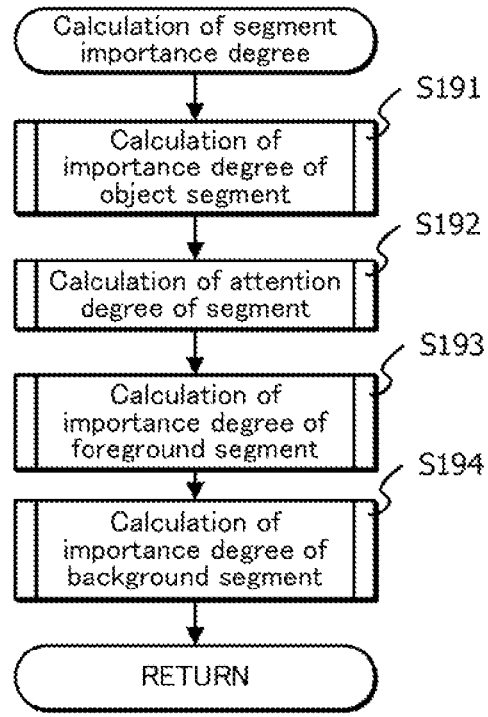
FIG. 19 is a flowchart showing operations of calculating segment importance degrees.

As shown in FIG. 19, the segment importance degree calculation unit 52 calculates a segment importance degree of an object segment included in an image (Step 191), and then calculates respective segment attention degrees of a foreground segment and a background segment included in the image (Step S192). Then, the segment importance degree calculation unit 52 calculates a segment importance degree of the foreground segment based on the calculated segment attention degree of the foreground segment (Step S193), and then calculates a segment importance degree of the background segment (Step S194).

The segment attention degree is one type of element for calculating an importance degree of an image based on the assumptions that users tend to photograph an image in a positional relation where an important person and an important subject are point symmetrical. The segment attention degree is calculated based on the positional relation between a person and a foreground (i.e., object) included in the image. Segment attention degree calculation processing is described later with reference to FIG. 22.

Figure 20:
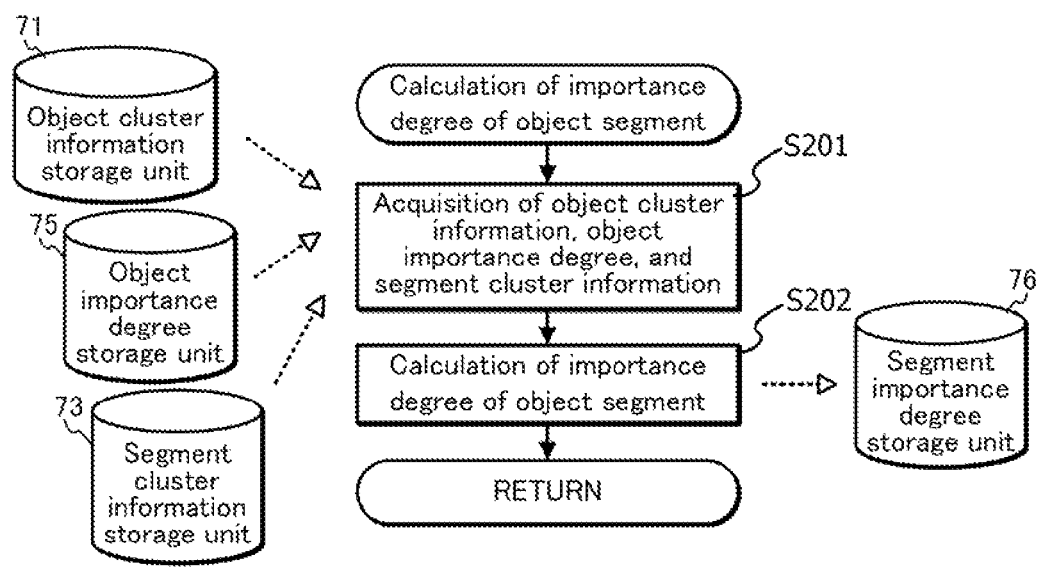
FIG. 20 is a flowchart showing operations of calculating segment importance degrees of object segments.

The following describes the object segment importance degree calculation processing (Step S191) with reference to FIG. 20. The segment importance degree calculation unit 52 acquires object cluster information from the object cluster information storage unit 71, acquires an object importance degree from the object importance degree information storage unit 72, and acquires segment cluster information relating to an object segment from the segment cluster information storage unit 73 (Step S201). Then, the segment importance degree calculation unit 52 calculates an importance degree of a person represented by the object segment, as an importance degree of the object segment (Step S202).

Figure 21:
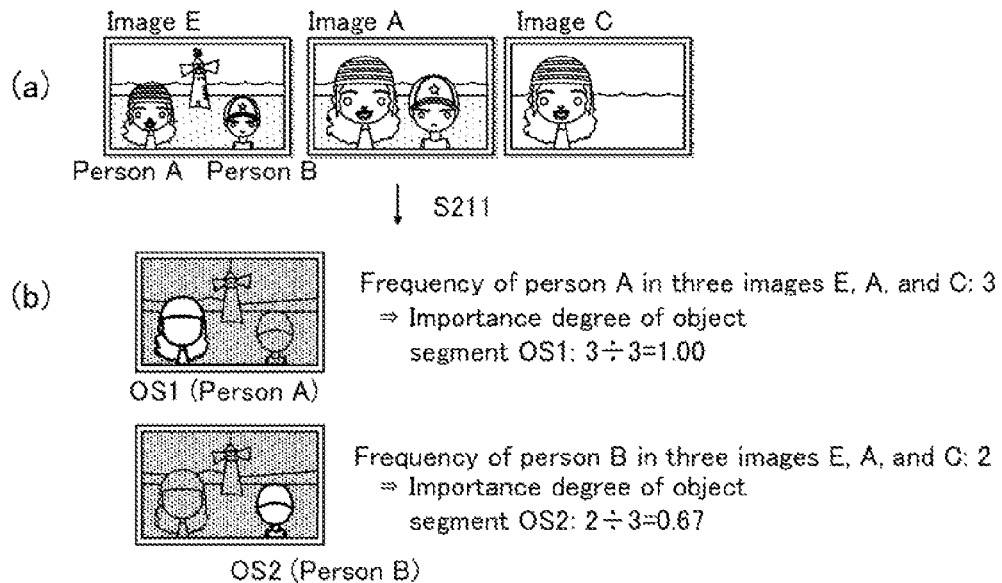
FIG. 21 is an image diagram showing a specific example of calculation of segment importance degrees of object segments.

The following specifically describes the operation of Step S202 with reference to FIG. 21. With respect to the face (i.e., object) extracted from the image in Step S32, the segment importance degree calculation unit 52 calculates an appearance frequency of the face in all the images included in the image group, and normalizes the calculated appearance frequency to calculate a segment importance degree of each object segment included in the image (Step S211). Here, the segment importance degree calculation unit 52 for example classifies persons A and B appearing in an image E among images E, A, and C (portion (a) of FIG. 21) as object segments OS1 and OS2, respectively. Then, the segment importance degree calculation unit 52 normalizes the respective appearance frequencies of the persons A and B to calculate respective importance degrees of the object segments OS1 and 052 (portion (b) of FIG. 21).

The following describes the segment attention degree calculation processing (Step S192) shown in FIG. 16.

Figure 22:
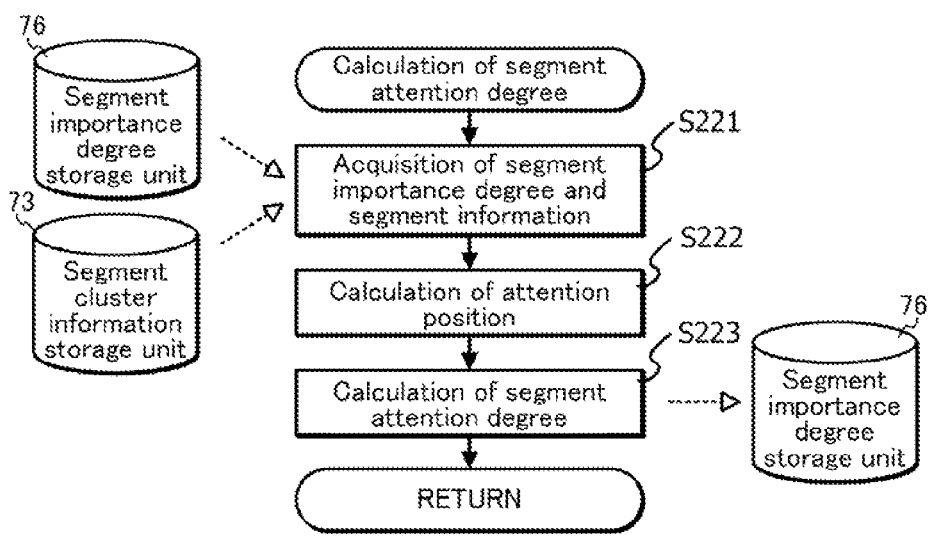
FIG. 22 is a flowchart showing operations of calculating segment importance degrees.

As shown in FIG. 22, the segment importance degree calculation unit 52 acquires segment cluster information from the segment cluster information storage unit 73, and acquires a segment importance degree from the segment importance degree storage unit 76 (Step S221). Then, the segment importance degree calculation unit 52 calculates an attention position based on the acquired segment cluster information and segment importance degree (Step S222), and calculates respective segment attention degrees of a foreground segment and a background segment included in the image based on the calculated attention position (Step S223).

Figure 23:
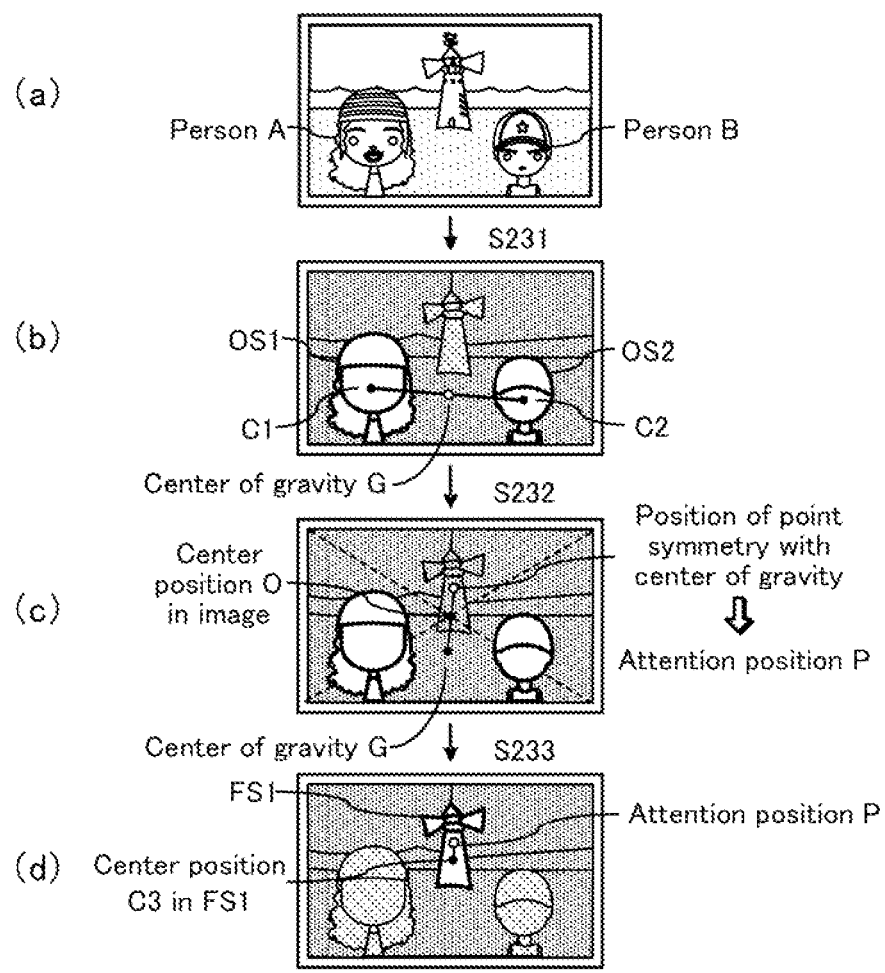
FIG. 23 is a flowchart showing a specific example of calculation of segment importance degrees.

The following specifically describes the operations of Steps S222 and S223 with reference to FIG. 23. The segment importance degree calculation unit 52 calculates the center of gravity in the image based on a center position and a segment importance degree of the object segment (Step S231). The segment importance degree calculation unit 52 calculates an attention position based on the calculated center of gravity and the center position of the image, such that the center of gravity and the attention position are point symmetrical (Step S232). Then, the segment importance degree calculation unit 52 calculates a segment attention degree based on a distance between the calculated attention position and a segment other than the object segment and an average of the segment importance degrees of the object segments (Step S233). In this example, with respect to the image E (portion (a) of FIG. 23), the segment importance degree calculation unit 52 calculates a center position C1 of the object segment OS1 where the person A appears and a center position C2 of the object segment OS2 where the person B appears.

The segment importance degree calculation unit 52 calculates the coordinates of the center of gravity G by the following equation (portion (b) of FIG. 23): (coordinate of C1×importance degree of OS1+coordinate of C2×importance degree of OS2)/(importance degree of OS1+importance degree of OS2).

Then, the segment importance degree calculation unit 52 determines a position in the image E as an attention position P, such that the center of gravity G and the determined position are point symmetrical with respect to the center point in the image E (portion (c) of FIG. 23).

Also, the segment importance degree calculation unit 52 calculates a center position C3 of a foreground segment FS1 where the lighthouse appears, and calculates a segment attention degree of the foreground segment FS1 based on the distance between the attention position P and the center position C3 (portion (d) of FIG. 23). As described above, in the case where a subject and an important person are point symmetrical in an image, the subject is estimated to be regarded as important by the user. Therefore, the closer to the attention position P a foreground segment and/or a background segment is, the higher a segment attention degree of the foreground segment and/or the background segment is.

The following describes the foreground segment importance degree calculation processing (Step S193) shown in FIG. 19.

Figure 24:
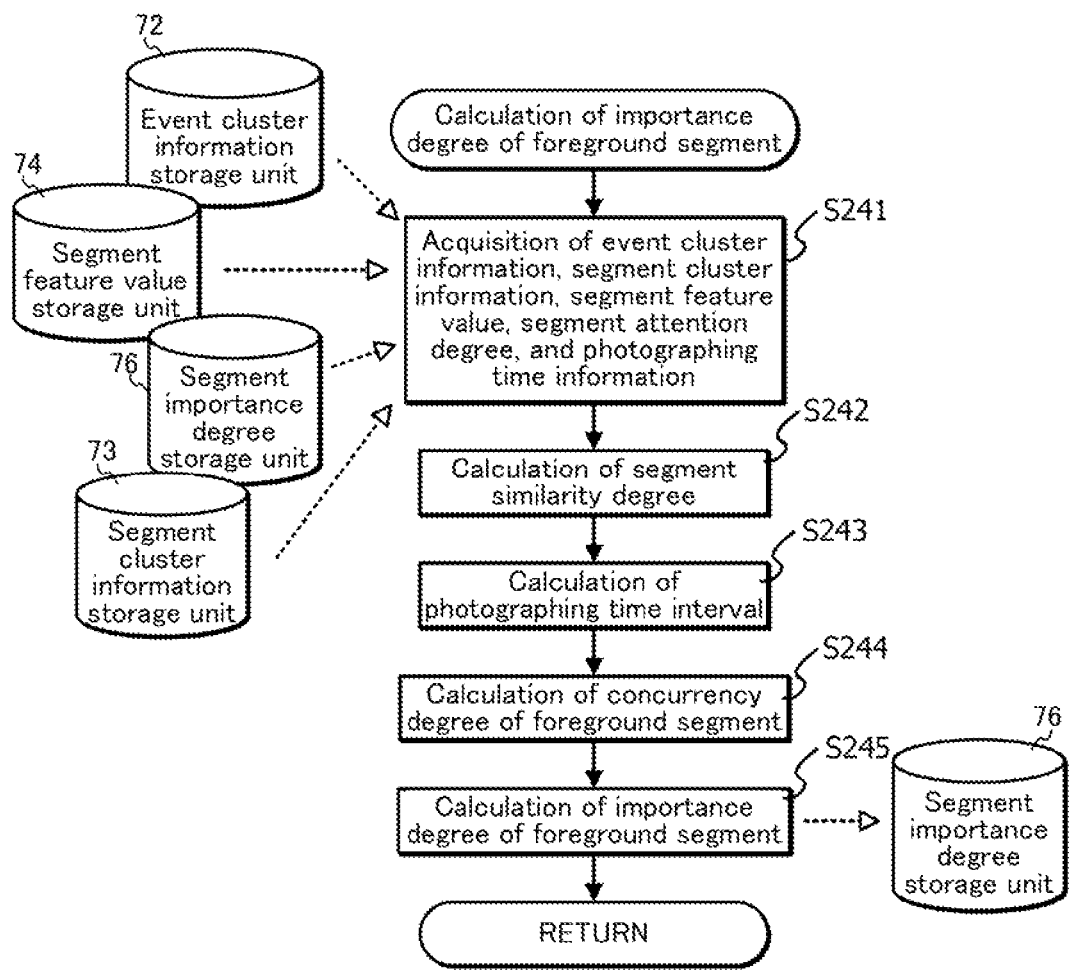
FIG. 24 is a flowchart showing operations of calculating segment importance degrees of foreground segments.

As shown in FIG. 24, the segment importance degree calculation unit 52 acquires event cluster information, segment cluster information, a segment feature value, a segment attention degree, and photographing time information from the storage unit 72 73, and 76, respectively (Step S241).

With reference to the event cluster information, the segment importance degree calculation unit 52 specifies one or more other images belonging to the same event to which a target image that is a calculation target of a segment importance degree of a foreground segment belongs, and calculates a similarity degree in feature value between the target image and each of the other images (Step S242). Then, the segment importance degree calculation unit 52 calculates a photographing time interval between the target image and each of the other images based on photographing time information (Step S243).

The segment importance degree calculation unit 52 calculates a concurrency degree of a foreground segment, based on the similarity degree calculated in Step S242 and the photographing time interval calculated in Step S243 (Step S244). The processing of Steps S242 to S244 is performed on each combination of the target image and each of the other images belonging to the same event to which the target image belongs. The segment importance degree calculation unit 52 calculates the segment importance degree of the foreground segment included in the target image based on all the calculated concurrency degrees of the foreground segment, and stores the calculated segment importance degree into the segment importance degree storage unit 76 (Step S245).

Here, the concurrency degree of the foreground segment is one type of element for calculating an importance degree of an image based on the assumptions that users tend to photograph an important subject many times for a short period. The concurrency degree of the foreground segment is calculated based on the relation in foreground segment between the target image and each of the other images belonging to the same event to which the target image belongs.

Figure 25:
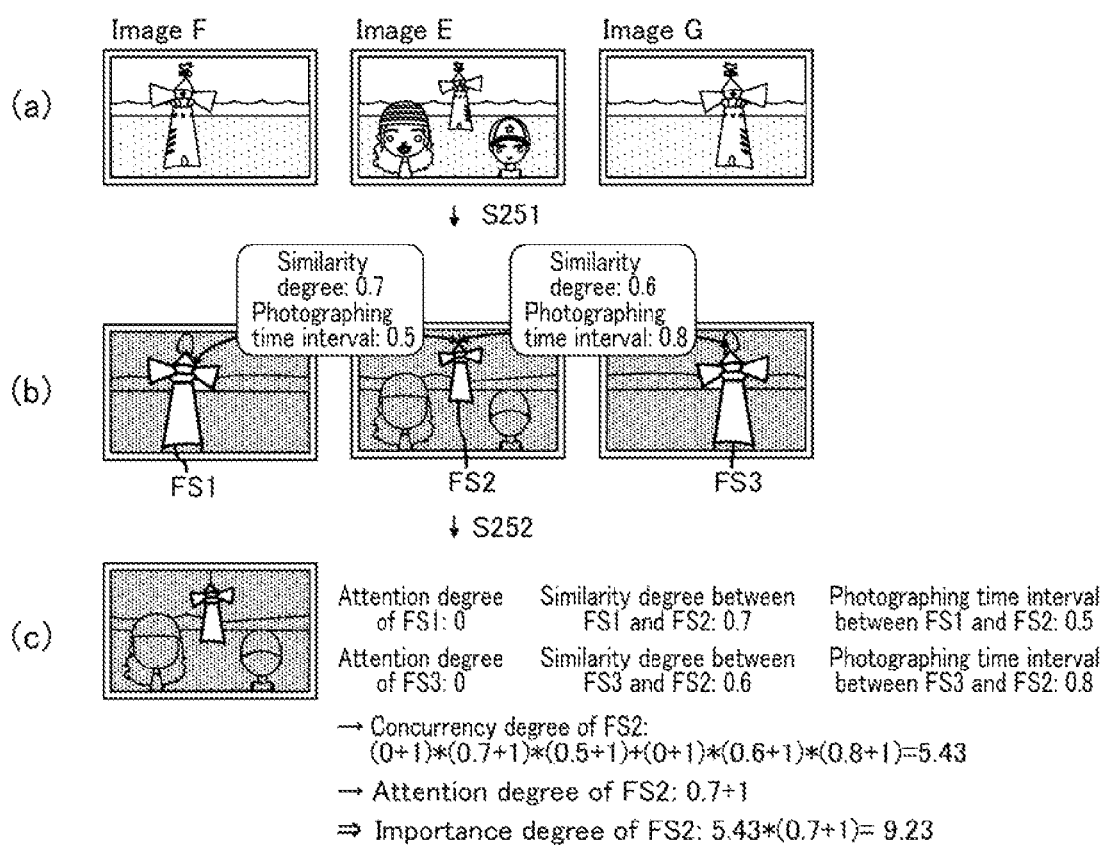
FIG. 25 is an image diagram showing a specific example of calculation of segment importance degrees of foreground segments.

The following specifically describes the operations of Steps S242 to S245 with reference to FIG. 25. The segment importance degree calculation unit 52 calculates a similarity degree in segment feature value between a foreground segment extracted from the target image and a foreground segment extracted from each of respective images anterior and posterior to the target image. The segment importance degree calculation unit 52 calculates a concurrency degree of the foreground segment in the target image, based on the highest similarity degree among the calculated similarity degrees in foreground segment, a segment attention degree of the foreground segment having the highest similarity degree, and the photographing time interval between the target image and each of the respective images anterior and posterior to the target image.

In this example, the segment importance degree calculation unit 52 extracts foreground segments FS1, FS2, and FS3 from images F, E, and G, respectively (portion (a) of FIG. 25), and calculates a similarity degree between the foreground segment FS2 included in the image E and the foreground segment FS1 included in the image F anterior to the image E and a similarity degree between the foreground segment FS2 included in the image E and the foreground segment FS3 included in the image G posterior to the image E.

Next, the segment importance degree calculation unit 52 selects a foreground segment having the highest similarity degree among the foreground segments included in the images anterior and posterior to the image E. Here, the foreground segments FS1 and FS3 are selected. Then, the segment importance degree calculation unit 52 multiplies a value resulting from adding one to the similarity degree of the selected foreground segment, a value resulting from adding one to the segment attention degree of the selected foreground segment, and a value resulting from adding one to the photographing time interval between the target image and the image including the selected foreground segment. This results in a concurrency degree of the foreground segment FS2 in the target image (Step S251). In this example, the concurrency degree of the foreground segment FS2 in the image E is 5.43. Note that the photographing time interval has a value falling within a range of zero to one. The higher the value is, the shorter the photographing time interval is. Also, the similarity degree has a value falling within a range of zero to one. The higher the value is, the more the foreground segments included in the two images are similar.

Finally, the segment importance degree calculation unit 52 multiplies the concurrency degree of 5.43 by a value resulting from adding one to the segment attention degree of 0.7 to calculate a value of 9.23 as a segment importance degree of the foreground segment FS2 for output (Step S252).

Through these calculations, as the photographing time interval with the target image is shorter and/or as the image anterior and/or posterior to the target image has a higher similarity degree in segment feature value with the target image, the foreground segment of the target image is evaluated as a more important foreground segment.

The equation shown in portion (c) of FIG. 25 is just an example. Alternatively, any equation may be employed as long as it is possible to reflect, to the equation, the tendency such as described above that the user photographs an important subject many times for a short period. In other words, any equation may be employed, as long as a foreground segment that is a target of calculating a segment importance degree in a target image is calculated such that (i) the higher the similarity degree between the target foreground segment and a foreground segment in an image anterior and/or posterior to the target image is and/or (ii) the shorter the photographing time interval between the target image and the anterior image and/or the posterior image is, the higher the segment importance degree of the target foreground segment is. Also, the element of photographing time interval does not necessarily need to be used. There may be a case where the element of photographing time interval is not used.

Figure 26:
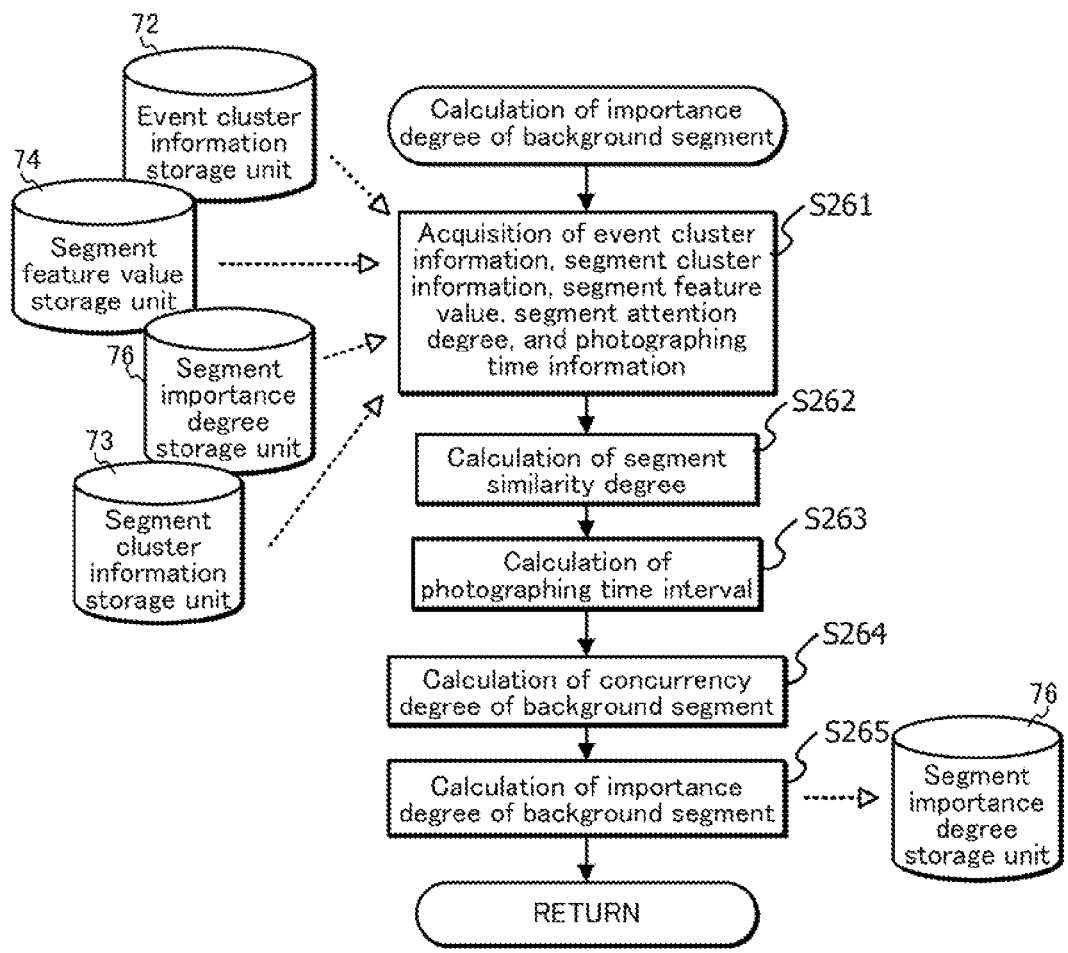
FIG. 26 is a flowchart showing operations of calculating segment importance degrees of background segments.

The following describes the background segment importance degree calculation processing (Step S194) with reference to FIG. 26.

The segment importance degree calculation unit 52 acquires event cluster information, segment cluster information, segment feature values, a segment importance degree of a background segment, and photographing time information from the respective storage units (Step S261).

With reference to the event cluster information, the segment importance degree calculation unit 52 specifies one or more other images belonging to the same event to which a target image that is a calculation target of the importance degree of the background segment belongs, and calculates a similarity degree in feature value between the target image and each of the other images (Step S262).

Then, the segment importance degree calculation unit 52 calculates a photographing time interval between the target image and the other image based on the photographing time information (Step S263).

The segment importance degree calculation unit 52 calculates a concurrency degree of the background segment based on the similarity degree calculated in Step S262 and the photographing time interval calculated in Step S263 (S264).

The processing of Steps S262 to S264 is performed on the target image and each of the other images belonging to the same event to which the target image belongs. The segment importance degree calculation unit 52 calculates an importance degree of the background segment of the target image based on all the calculated concurrency degrees of the background segments, and stores the calculated importance degree into the segment importance degree storage unit (Step S265).

The following specifically describes the operations of Steps S262 to S265 with reference to FIG. 27. The segment importance degree calculation unit 52 calculates a similarity degree in segment feature value between the background segment extracted from the target image and the background segment extracted from respective images located anterior and posterior to the target image.

The segment importance degree calculation unit 52 calculates a concurrency degree of the background segment in the target image, based on the highest similarity degree of the background segment among the calculated similarity degrees, a segment attention degree of the foreground segment having the highest similarity degree, and the calculated photographing time interval between the target image and each of the respective images anterior and posterior to the target image.

In this example, the segment importance degree calculation unit 52 extracts six background segments, seven background segments, and six background segments from the images F, E, and G, respectively (Step S271 and portions (a) and (b) of FIG. 27). The segment importance degree calculation unit 52 determines, as a calculation target, a background segment BS2 whose segment importance degree has not yet been calculated, among the six background segments of the image E. The segment importance degree calculation unit 52 selects background segments BS1 and BS3 each having the highest similarity degree with the background segment BS2 among the background segments included in the images F and G (Step S272). Then, the segment importance degree calculation unit 52 calculates a similarity degree between the background segments BS2 and BS1 and a similarity degree between the background segments BS2 and BS3.

The segment importance degree calculation unit 52 multiplies the calculated similarity, a segment attention degree of the selected background segment, and the photographing time interval with the target image to calculate a concurrency degree of the background segment BS2 in the target image. In this example, the concurrency degree of the background segment BS2 in the image E is 5.43.

Finally, the segment importance degree calculation unit 52 multiplies the concurrency degree of 5.43 by a value resulting from adding one to the segment attention degree of 0.7 to calculate a value of 9.23 as the importance degree of the foreground segment FS2 for output (Step S273).

Since the image E includes six background segments, the segment importance degree calculation unit 52 similarly calculates a segment importance degree of each of remaining five background segments.

Note that the calculation method shown in FIG. 27 is just an example, and various modifications may be employed like in the segment importance degree of foreground segment as described above.

FIG. 28 shows the data structure of the segment importance degree indicating results of the segment importance degree calculation (Step S162). The segment importance degree is information indicating an importance degree of each of an object segment, a foreground segment, and a background segment included in an image. The segment importance degree includes items such as "Image ID", "Segment classification", "Segment attention degree", "Concurrency degree", and "Segment importance degree".

Figure 29:
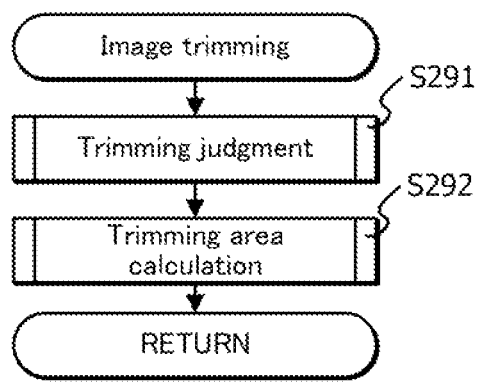
FIG. 29 is a flowchart showing operations of image trimming.

The following describes the image trimming processing (Step S23) shown in FIG. 2 with reference to FIG. 29. The judgment unit 61 makes a trimming judgment (Step S291), and calculates a trimming area with use of a trimming method resulting from the judgment (Step S292).

Figure 30:
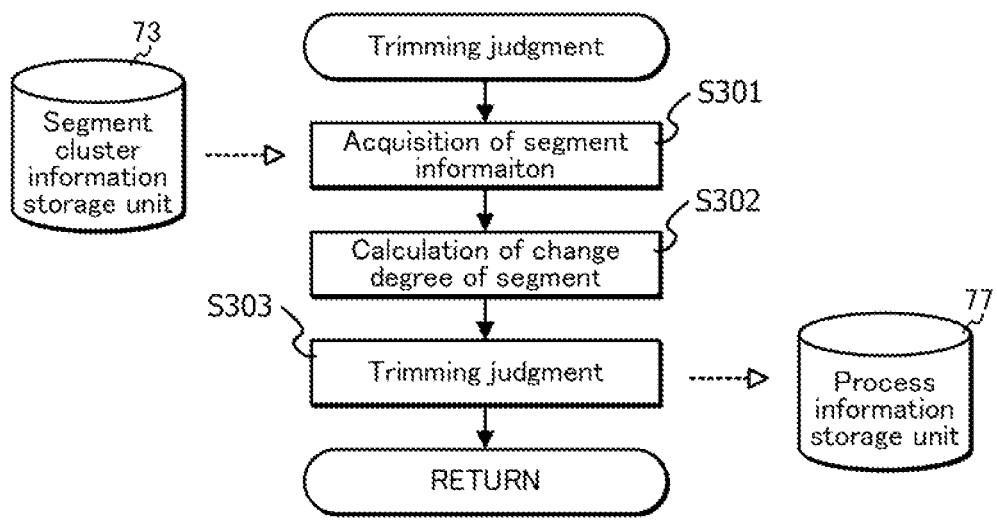
FIG. 30 is a flowchart showing operations of trimming judgment.

The following describes the trimming judgment processing (Step S291) with reference to FIG. 30. The judgment unit 61 acquires segment information from the segment cluster information storage unit 73 (Step S301).

Then, based on the type and the size of each segment indicated by the segment cluster information, the judgment unit 61 calculates a change degree indicating a degree of size change in area of each of object segment and foreground segment between a target image to be trimmed and each of respective images photographed before and after the target image (Step S302). Based on the calculated change degree, the judgment unit 61 judges which of the zoom-in trimming method and the zoom-out trimming method is to be used, and stores a result of the judgment into to the process information storage unit 77 (Step S303).

Here, zoom-in trimming indicates cut-out of an area including an object segment and a foreground segment each having a high segment importance degree. Zoom-out trimming indicates cut-out of an area including an object segment, a foreground segment, and a background segment each having a high segment importance degree.

Figure 31:
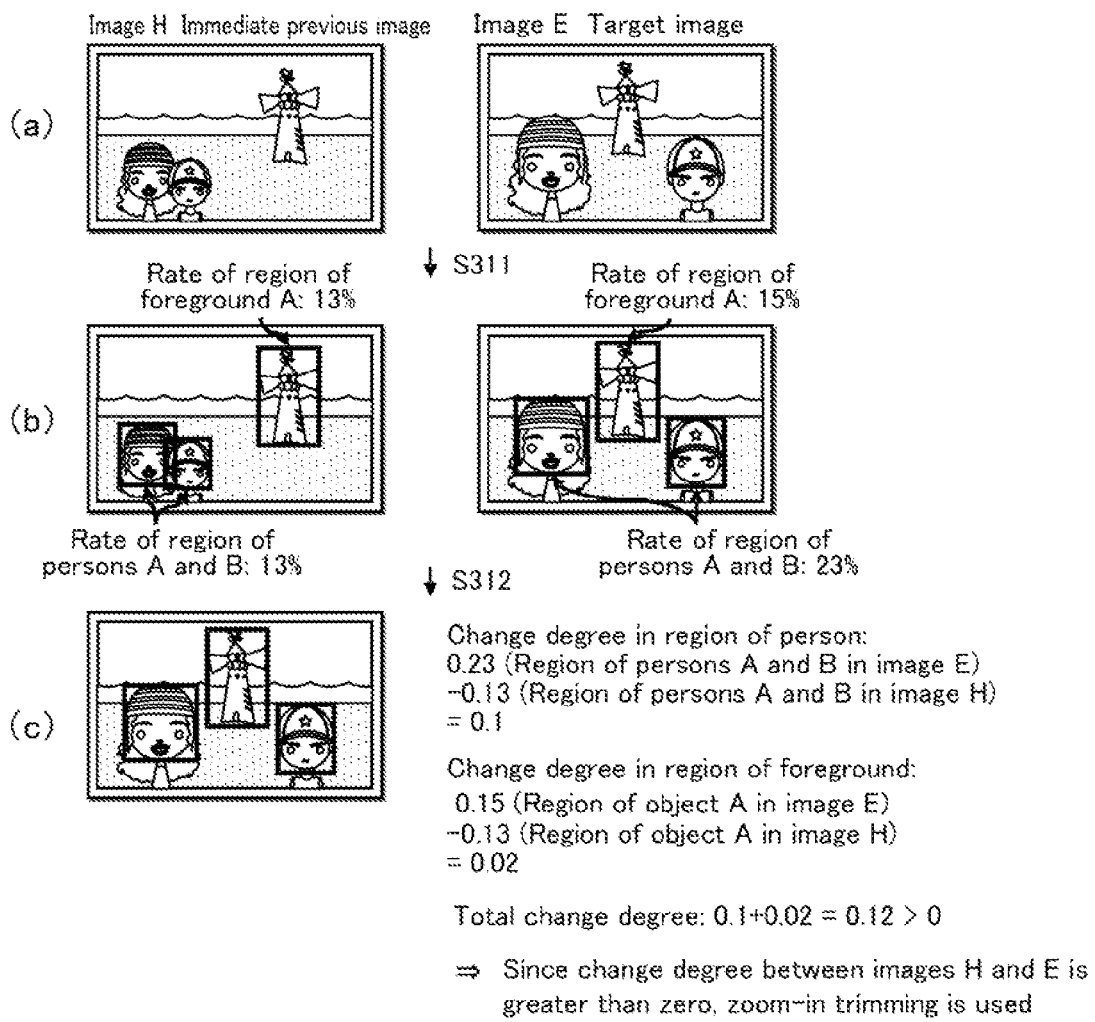
FIG. 31 is an image diagram showing a specific example of trimming judgment.

The following specifically describes the operations of Steps S302 and S303 with reference to FIG. 31. The judgment unit 61 calculates a change degree based on a difference in occupation rate (occupation degree) of each of an object segment and a foreground segment between a target image and each of images anterior and to the target image, and judges a type of trimming method to be used based on the calculated change degree. In this example, the judgment unit 61 extracts persons A and B as an object segment and a foreground A as a foreground segment from each of images H and E (portion (a) of FIG. 31) (Step S311). Next, the judgment unit 61 calculates an occupation degree of the object segment and an occupation degree of the foreground segment extracted from each of the images H and E. In this case, the occupation degree of the object segment in the image H is 0.13, and the occupation degree of the object segment in the image E is 0.23. Also, the occupation degree of the foreground segment in the image H is 0.13, and the occupation degree of the foreground segment in the image E is 0.15. Next, the judgment unit 61 subtracts the respective occupation degrees of the object segment and the foreground segment in the anterior image H from the respective occupation degrees of the object segment and the foreground segment in the target image E, respectively. As a result, respective change degrees in object segment and foreground segment between the images H and E are calculated. In this case, the change degree of the object segment is 0.1, and the change degree of the foreground segment is 0.02. Then, the judgment unit 61 adds the change degree of the object segment and the change degree of the foreground segment to calculate the total change degree of 0.12 between the images H and E (Step S312).

The object segment and the foreground segment both increase in size from the anterior image to the target image. In other words, the change degree between the anterior image and the target image has a positive number. Therefore, the judgment unit 61 judges that the zoom-in trimming method is to be used.

On the contrary, in the case where the object segment decreases in size from the anterior image to the target image, the judgment unit 61 judges that the zoom-out trimming method is to be used.

Note that, for simplifying calculations, in the example shown in FIG. 31, the size of the area including a person's face is used as the size of the area including the person. Alternatively, the size of the area including not only the person's face but also the person's body may be used as the size of the area including the person.

Figure 32:
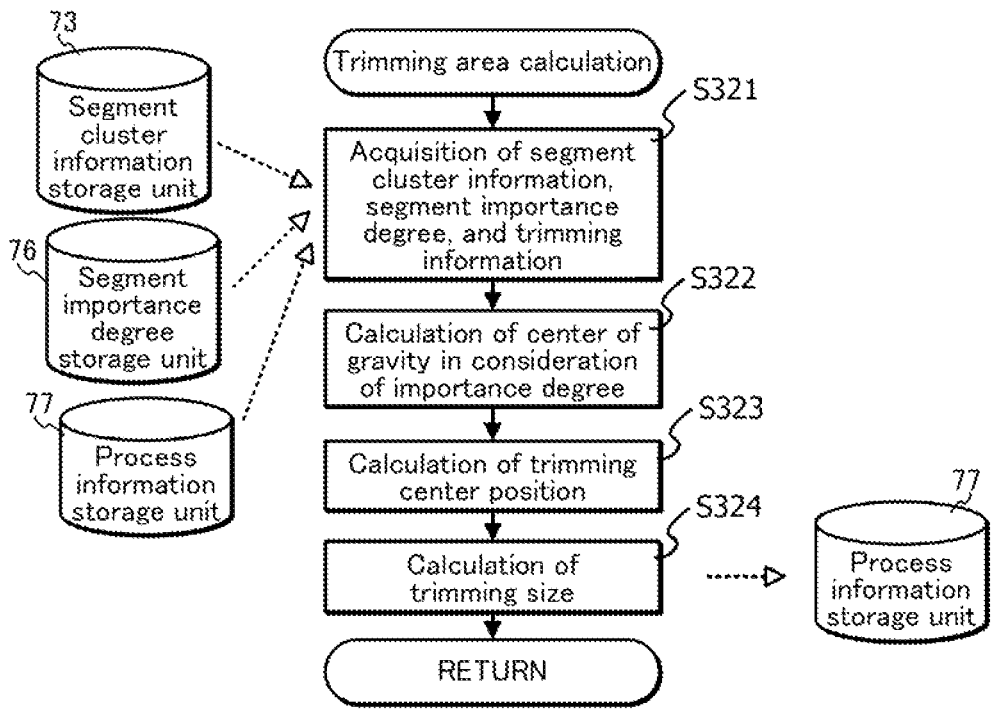
FIG. 32 is a flowchart showing operations of trimming area calculation.

The following describes the trimming area calculation processing (Step S292) with reference to FIG. 32. The area calculation unit 62 acquires segment cluster information from the segment cluster information storage unit 73, acquires a segment importance degree from the segment importance degree storage unit 76, and acquires trimming information from the process information storage unit 77 (Step S321). Then, the area calculation unit 62 calculates the center of gravity in each of the object segment, the foreground segment, and the background segment included in the target image based on the acquired segment cluster information and segment importance degree (Step S323).

When the trimming judgment (Step S291) results in the zoom-out trimming method, the area calculation unit 62 calculates the trimming center position based on the respective center positions of the object segment, the foreground segment, and the background segment.

The trimming center position is calculated in consideration, as weighting, of the coordinate value of the center position and the segment importance degree of each segment. FIG. 36 shows an example of calculation of the trimming center position.

According to the example shown in FIG. 36, the XY coordinates of the trimming center position T are calculated as follows:

$X$ coordinate of trimming center position $T=[(\text{importance degree of OS1} \times x1)+(\text{importance degree of OS2} \times x2)+(\text{importance degree of OS3} \times x3)]/[\text{importance degree of OS1}+(\text{importance degree of OS2})+(\text{importance degree of OS3})]$; and $Y$ coordinate of trimming center position $T=[(\text{importance degree of OS1} \times y1)+(\text{importance degree of OS2} \times y2)+(\text{importance degree of OS3} \times y3)]/[\text{importance degree of OS1}+(\text{importance degree of OS2})+(\text{importance degree of OS3})]$.

When the trimming judgment (Step S291) results in the zoom-out trimming method, the area calculation unit 62 calculates the trimming center position based on the respective center positions of the object segment, the foreground segment, and the background segment (Step S323). The calculation of the trimming center position by the zoom-out trimming method is performed in the same manner as by the zoom-in trimming method.

In the case where the zoom-in trimming method is used, the area calculation unit 62 calculates a trimming area including an object segment having the highest segment importance degree among all the object segments and a foreground segment having the highest segment importance degree among all the foreground segments.

In the case where the zoom-out trimming method is used compared with this, the area calculation unit 62 calculates a trimming area including an object segment having the highest segment importance degree among all the object segments, a foreground segment having the highest segment importance degree among all the foreground segments, and a background segment having the highest segment importance degree among all the background segments.

The area calculation unit 62 stores the type of the used trimming method, a position of the calculated trimming area into the process information storage unit 77 (Step S324).

In the following, specific description is provided on the operations of Step S322 to S324.

Figure 33:
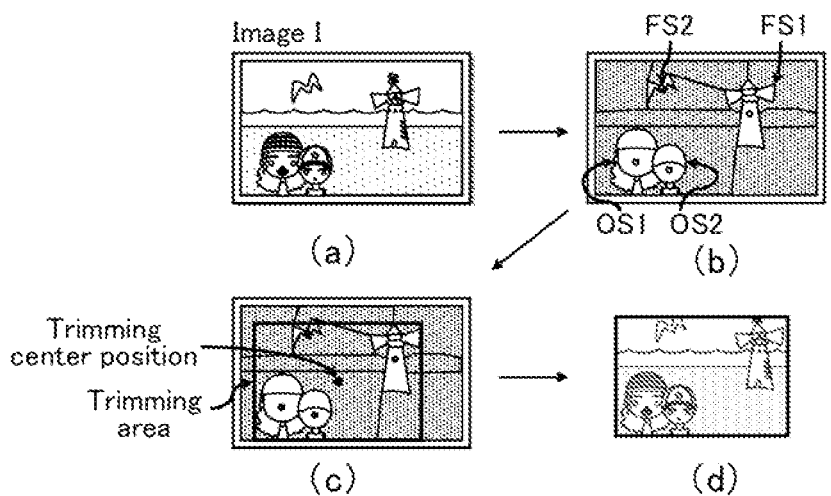
FIG. 33 is an image diagram showing a specific example of calculation of trimming area by a zoom-in trimming method.

The following describes an example of the zoom-in trimming method with reference to FIG. 33.

The area calculation unit 62 calculates the trimming center position based on the respective center positions and the respective object importance degrees of all the object segments and foreground segments extracted from the target image. Then, the area calculation unit 62 calculates, as a trimming area, an area including an object segment having the highest segment importance degree among all the object segments and a foreground segment having the highest segment importance degree among all the foreground segments, such that the center position of the trimming area is coincident with the calculated trimming center position.

In this example, the area calculation unit 62 extracts, from an image I (portion (a) of FIG. 33), object segments OS1 and OS2 and foreground segments FS1 and FS2 (portion (b) of FIG. 33).

Next, the area calculation unit 62 calculates a trimming center position based on respective center positions and respective importance degrees of the object segments OS1 and OS2 and the foreground segments FS1 and FS2 (portion (c) of FIG. 33). Then, the area calculation unit 62 calculates, as a trimming area, an area including the object segment OS1 having the highest segment importance degree among all the object segments and the foreground segment FS1 having the highest segment importance degree among all the foreground segments (portion (d) of FIG. 33), such that the center position of the trimming area is coincident with the calculated trimming center position.

The following describes an example of zoom-out trimming with reference to FIG. 34.

The area calculation unit 62 calculates a trimming center position based on respective center positions and respective segment importance degrees of all the object segments, foreground segments, and background segments extracted from the target image. Then, the area calculation unit 62 calculates, as a trimming area, a rectangle area including an object segment having the highest segment importance degree among all the object segments, a foreground segment having the highest segment importance degree among all the foreground segments, and a background segment having the highest segment importance degree among all the background segments, such that the center position of the trimming area is coincident with the calculated trimming center position.

In this example, the area calculation unit 62 extracts, from an image J (portion (a) of FIG. 34), object segments OS1 and OS2 and background segments BS1 to BS7 (portion (b) of FIG. 34). Next, the area calculation unit 62 calculates the center of gravity in the image J based on respective center positions and respective importance degrees of the object segments OS1 and OS2 and the background segments BS1 to BS7 (portion (c) of FIG. 34). Then, the area calculation unit 62 calculates, as a trimming area, an area including the object segment OS1 having the highest segment importance degree among all the object segments and the background segment BS2 having the highest segment importance degree among all the background segments, such that the center position of the trimming area is coincident with the calculated center of gravity (portion (d) of FIG. 34).

FIG. 35 shows the data structure of trimming information indicating results of the trimming area calculation (Step S292). The trimming information includes items such as "Image ID", "Trimming type", "Trimming center position (X,Y)", and "Trimming size (W,H)".

The process execution unit 63 performs image trimming based on the trimming information.

According to the image processing device described in the present embodiment, respective importance degrees of an object segment and a foreground segment included in an image are calculated based on relations between areas included in the image and relation between each of the areas included in the image and any of areas included in each of one or more other images. Therefore, it is possible to contribute to cut-out of an area including an object that is estimated to be important for a user, without relying on the object recognition technology.

Embodiment 2

In the present embodiment, an image is acquired from an image group shared on a network by a service such as an SNS (Social Network Service) and an image sharing service. This increases the number of images that are evaluation targets, thereby improving the reliability of evaluation results.

Assume the case where a user A has an extremely small number of images photographed by himself during a trip, for example. In this case, because of the extremely small number of images, even if the method described in Embodiment 1 is used, evaluation might not be made on an image including a background (landscape) and a foreground which are impressive for the user A (portion (a) of FIG. 39).

In view of this, evaluation is also made on images photographed and uploaded on a social network by a user B who is a friend of the user A (portion (b) of FIG. 39). This enables more appropriate evaluation on an image including a background (landscape) and a foreground which are impressive for the user A.

Figure 40:
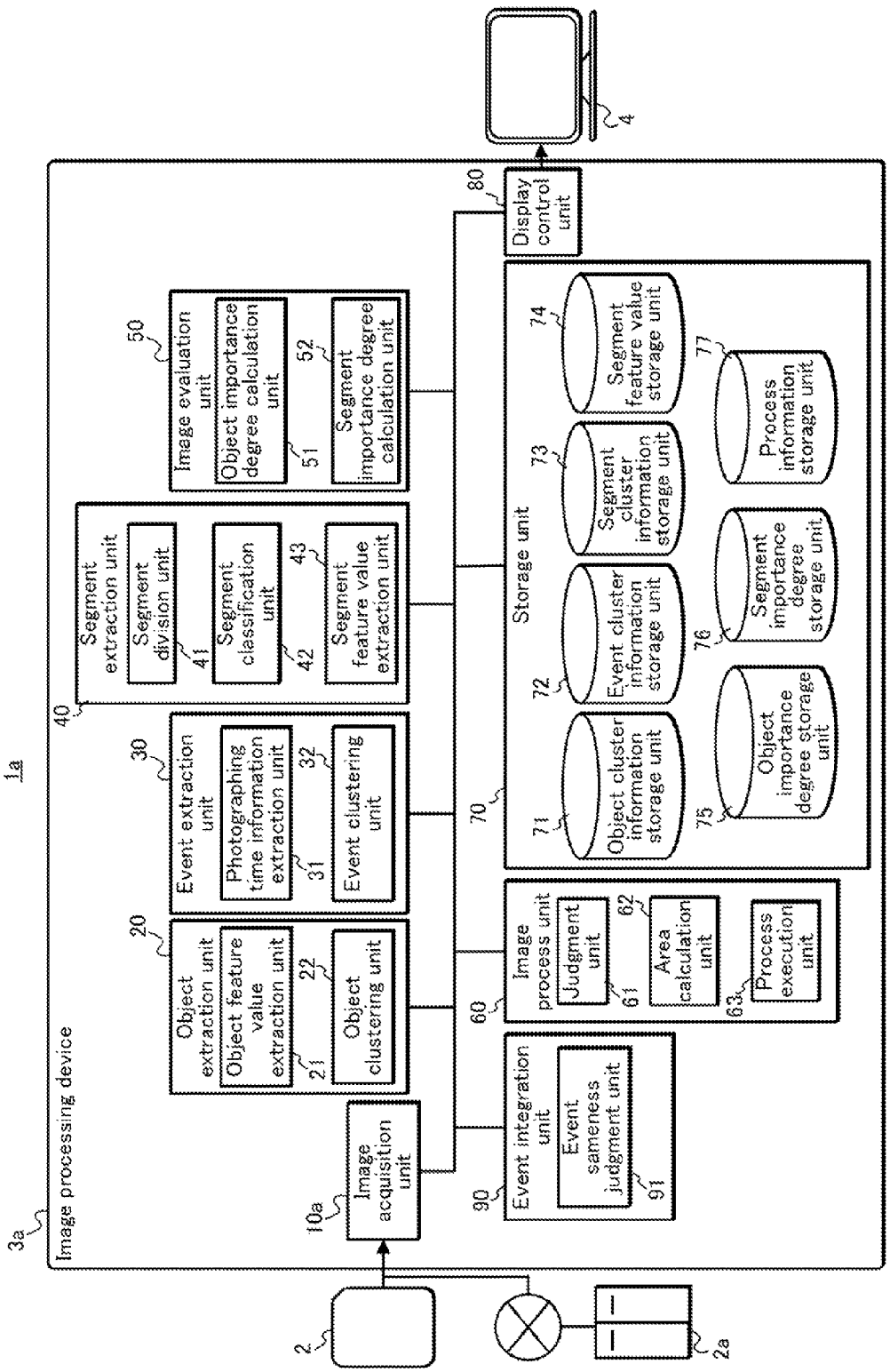
FIG. 40 is a block diagram showing an image processing system.

FIG. 40 is a block diagram showing an image processing system 1*a* relating to Embodiment 2.

An image acquisition unit 10*a* included in an image processing device 3*a* acquires an image from a storage medium 2. Also, the image acquisition unit 10*a* has received a user name on the SNS from a user beforehand. The image acquisition unit 10*a* acquires an image from an SNS server 2*a* with use of the user name via an API (Application Program Interface) of the SNS. Depending on the type of API of the SNS, authentication such as sign-in is necessary for image acquisition.

An event sameness judgment unit 91 included in an event integration unit 90 judges whether an event to which the image acquired from the SNS server 2*a* belongs is the same as an event indicated by event cluster information stored in the event cluster information storage unit 72. Then, the event integration unit 90 integrates the two events based on judgment results. The details are later described with reference to FIG. 42.

Figure 42:
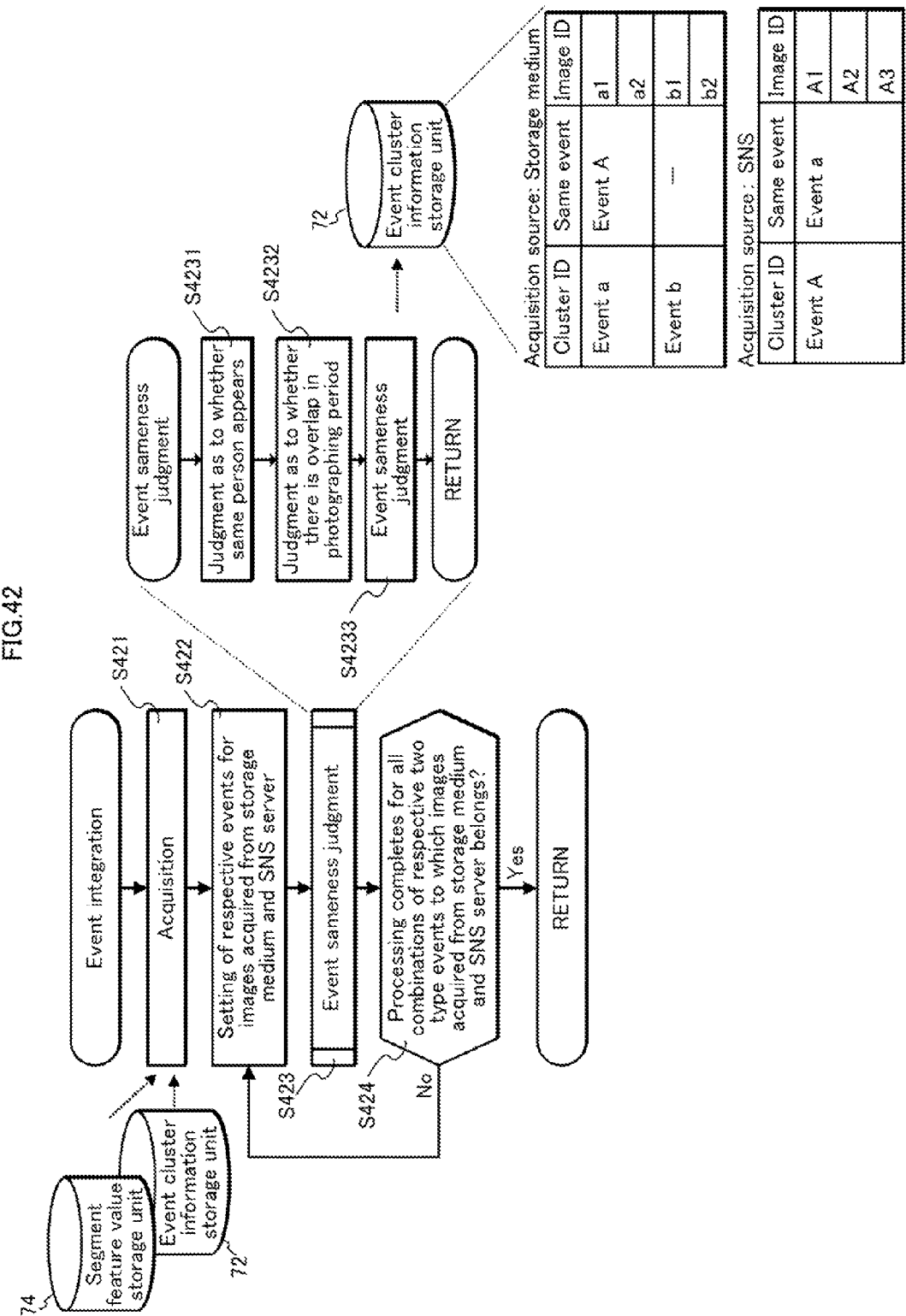
FIG. 42 shows operations of event integration.

Blocks shown in FIG. 42 having the same numeral references as those shown in FIG. 1 are the same as those shown in FIG. 1, and accordingly description thereof is omitted here.

<Operations>

Figure 41:
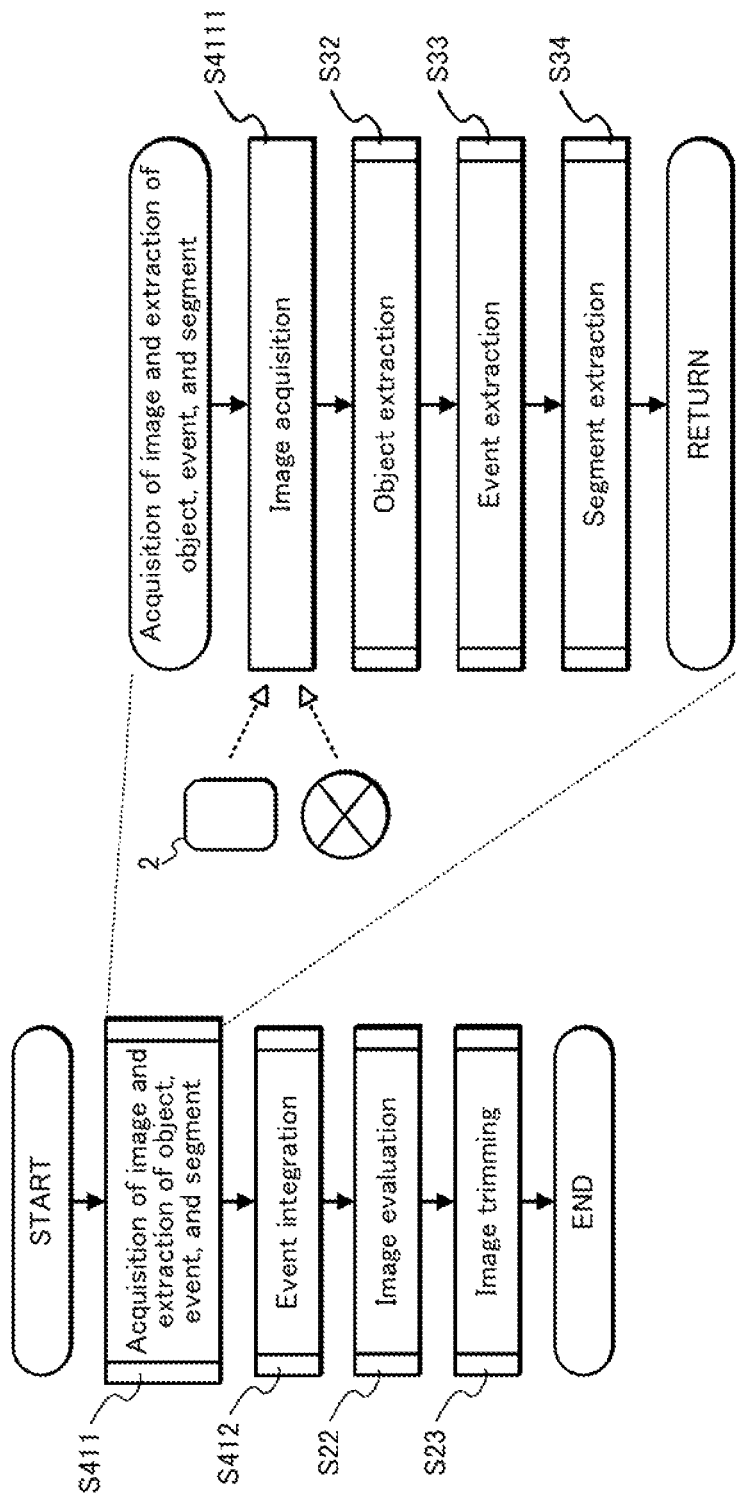
FIG. 41 shows an entire flowchart and a flowchart showing operations of image acquisition, object extraction, event extraction, and segment extraction.

FIG. 41 shows, in the left side, a flowchart of the entire flow, and in the right side, a flow chart of operations of image acquisition, object extraction, event extraction, and segment extraction.

The flowchart shown in FIG. 41 differs from the flowchart shown in FIG. 2 in details of the processing of image acquisition, object extraction, event extraction, and segment extraction (Step S411) and in addition of event integration processing (Step S412).

In the processing of image acquisition, object extraction, event extraction, and segment extraction, the image acquisition unit 10 acquires image data stored in the storage medium 2. Also, the image acquisition unit 10 acquires an image from the SNS server 2*a* through the API (Step S4111).

For example, the image acquisition unit 10 acquires an image owned by the user B who is the friend of the user A of the user from the SNS server 2*a* with use of a user name "User A" on the SNS.

The subsequent processing (Steps S32, S33, and S34) is basically the same as the processing described in Embodiment 1. Note that, in the event extraction processing (Step S33), the image acquisition unit 10 performs processing separately on the image acquired from the storage medium 2 and the image acquired from the SNS server 2*a*.

In the event integration processing (Step S412), the event integration unit 90 acquires a segment feature value of each segment from the segment feature value storage unit 74, and acquires event cluster information from the event cluster information storage unit 72 (Step S421).

Then, with reference to the event cluster information, the event integration unit 90 sets an event for the image acquired from the storage medium 2 and an event for the image acquired from the SNS server 2a (Step S422), and judges whether the set two events are the same (Step S423). The event integration unit 90 performs the processing on each of all the combinations of respective two types events to which two images acquired via different routes belong (Step S424).

For example, assume the case where the event cluster information acquired in Step S421 indicates that images acquired from the storage medium 2 are classified into two types of events of events a and b, and images acquired from the SNS server 2a are clustered into one type of event of an event A. In this case, firstly, the event integration unit 90 sets the event a and the event A (Step S422), and judges whether the event a and the event A are the same (Step S423). Next, the event integration unit 90 sets the event b and the event A (Step S422), and judges whether the event b and the event A are the same (Step S423), and the processing ends (Step S424: Yes).

The following describes the event sameness judgment processing. The event sameness judgment unit 91 compares in segment feature value between an image belonging to one of the two set events and an image belonging to the other of the two events, to judge whether the same person appears in the both two events (i.e., whether the same person is included in the respective two images belonging to the two events) (Step S4231).

Figure 43:
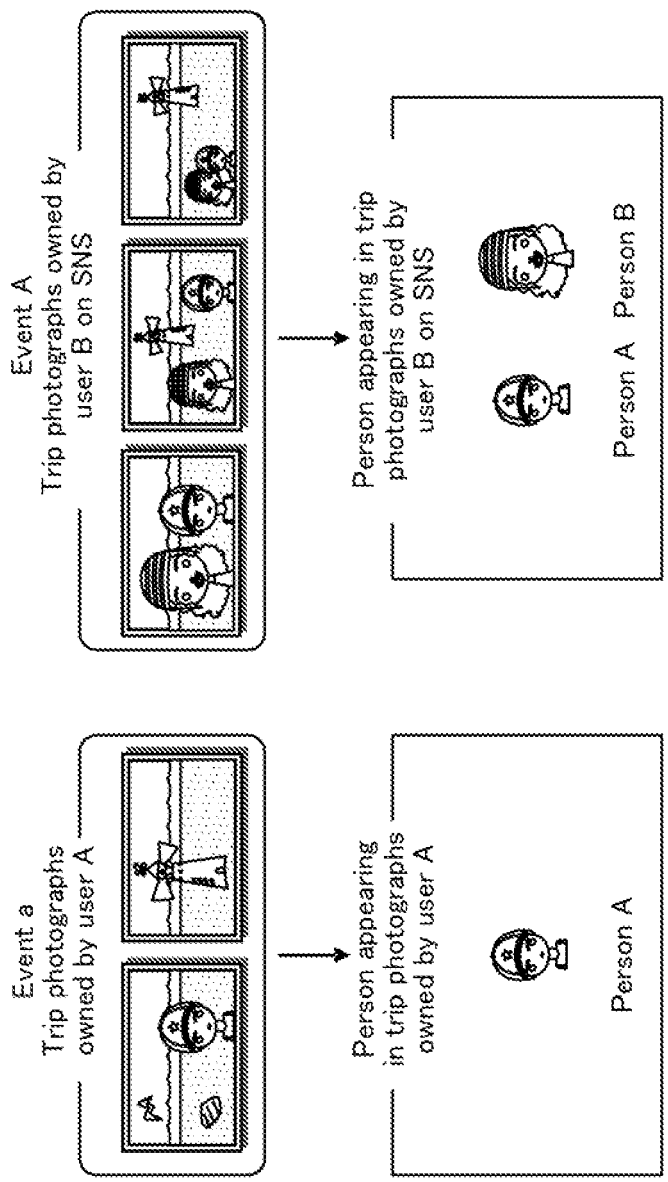
FIG. 43 is an image diagram showing a specific example of judgment as to whether the same person appears in two events.

FIG. 43 shows a specific example of this judgment. The event sameness judgment unit 91 extracts a person appearing in an image belonging to the event a acquired from the storage medium 2 and a person appearing in an image belonging to the event A acquired from the SNS server 2a, and judges whether the same person appears in the both two events. In the example shown in FIG. 43, the event sameness judgment unit 91 extracts a person appearing in the event a (trip photograph owned by the user A) and a person appearing in the event A (trip photograph on the SNS owned by the user B), and judges that the person A appears in both the event a and the event A.

The event sameness judgment unit 91 also judges an overlapping degree in photographing period between the two events (Step S4232).

Figure 44:
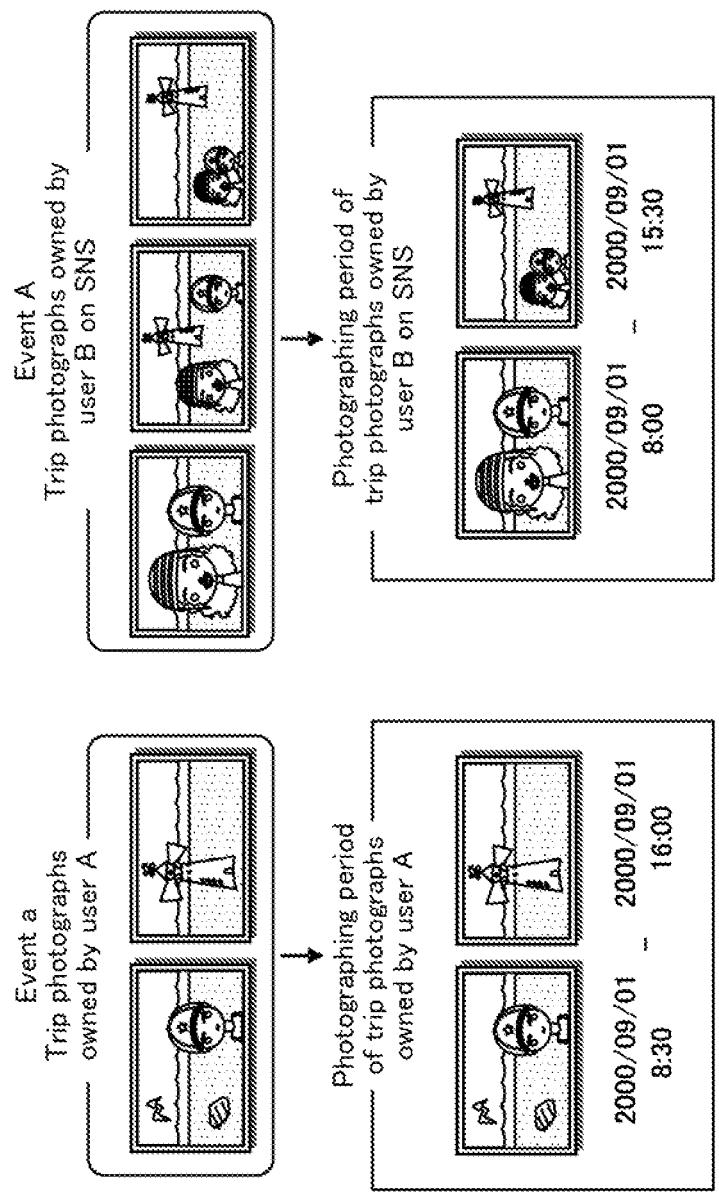
FIG. 44 is an image diagram showing a specific example of judgment as to whether two events overlap each other in photographing period.

FIG. 44 shows a specific example of this judgment. The event sameness judgment unit 91 extracts the oldest photographing time and the latest photographing time (namely, photographing period) from the images belonging to the event a, and extracts the oldest photographing time and the latest photographing time (namely, photographing period) from the images belonging to the event A. The event sameness judgment unit 91 judges whether the event a and the event A overlap each other in photographing period. In the example shown in FIG. 44, the event a and the event A overlap each other in photographing period during a period from 2000 Sep. 1 8:30 to 2000 Sep. 1 15:30.

The event sameness judgment unit 91 judges whether the two events are the same, based on these judgment results, specifically the results of the judgment as to whether the same person appears in the two events and the results of the judgment on the overlapping degree in photographing period. Note that according to the example of the method shown in FIG. 43 and FIG. 44, in the case where the same person does not appear in the both two events or the two events do not overlap each other in photographing period, the two events are judged as not the same.

Figure 45:
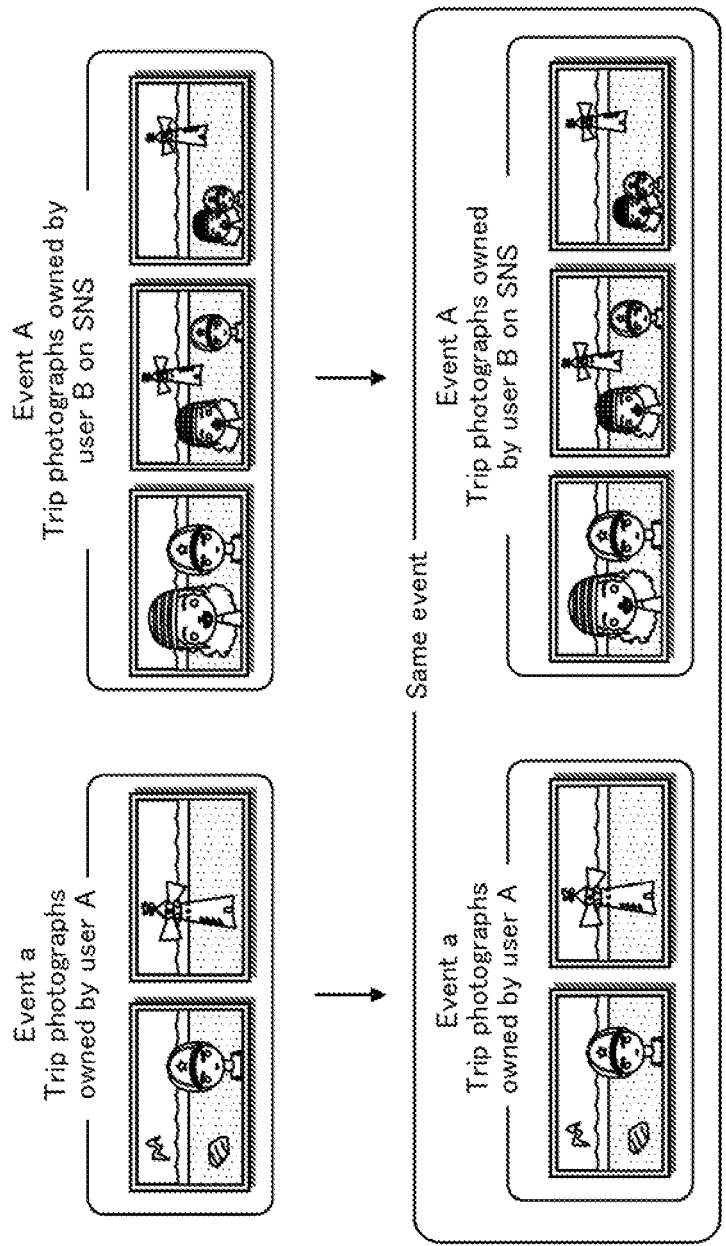
FIG. 45 is an image diagram showing a specific example of event sameness judgment.

In an example shown in FIG. 45, the same person A appears in the event a and the event A, and the event a and the event A overlap each other in photographing period during a certain period (i.e., to a certain rate). Accordingly, the event sameness judgment unit 91 judges that the event a and the event A are the same.

When judging that the two events are the same, the event sameness judgment unit 91 writes information indicating that the two events are the same into the event cluster information storage unit 77. A table shown on the bottom right in FIG. 42 indicates that the event a and the event A are the same. In the image evaluation processing (Step S22) and the image trimming processing (Step S23) subsequent to the event integration processing (Step S412 in FIG. 41) as described above, the event a and the event A are regard as the same. Accordingly, processing is performed on the images belonging to the event A on the SNS in addition to the images belonging to the event a. The increase in the number of sample images achieves evaluation results with a higher reliability.

According to the present embodiment as described above, images acquired from an SNS are added to evaluation target images thereby to increase the number of evaluation target images. This contributes to improvement in reliability of evaluation results.

Embodiment 3

In Embodiment 1, automatic trimming is performed without user operations. In the present embodiment compared with this, a trimming method with user operation is described.

Figure 46:
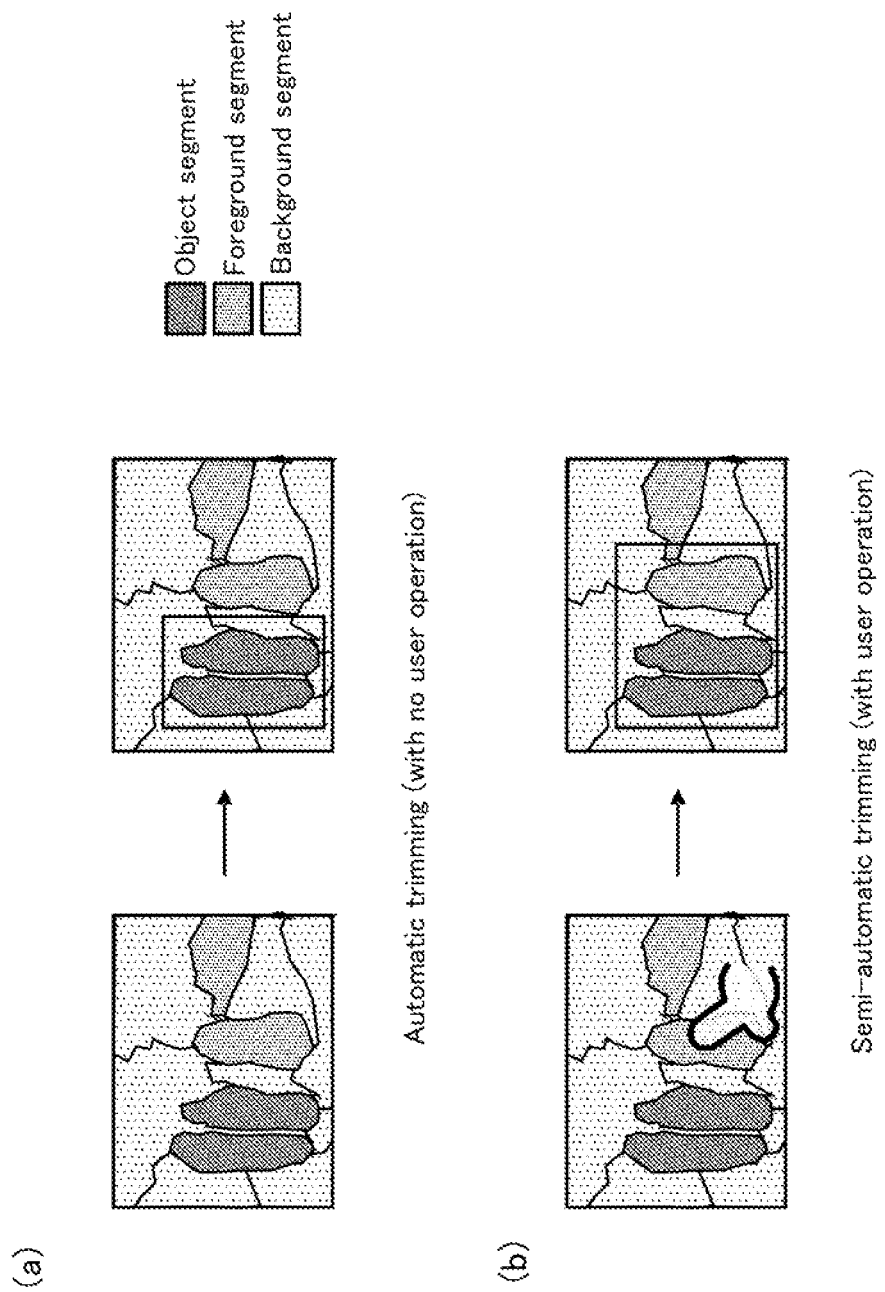
FIG. 46 shows the outline of Embodiment 3.

As shown in FIG. 46, a higher weighting is given to an object designated by the user, such that the designated object is included in a trimming area.

Figure 47:
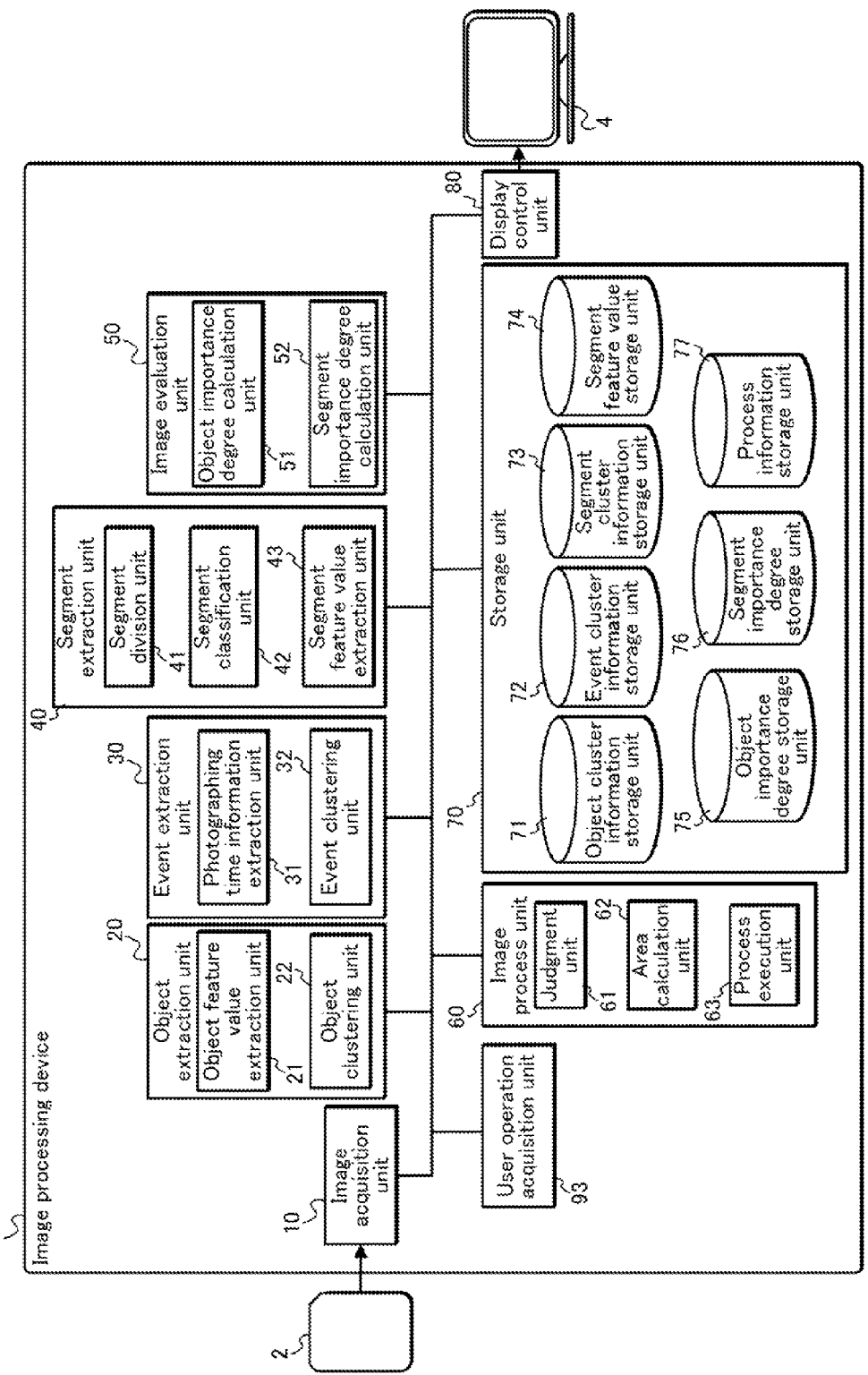
FIG. 47 is a block diagram showing an image processing system.

FIG. 47 is a block diagram showing an image processing system 1b relating to Embodiment 3.

A user operation acquisition unit 93 included in an image processing device 3b acquires a user operation via an input interface or the like.

<Operations>

Figure 48:
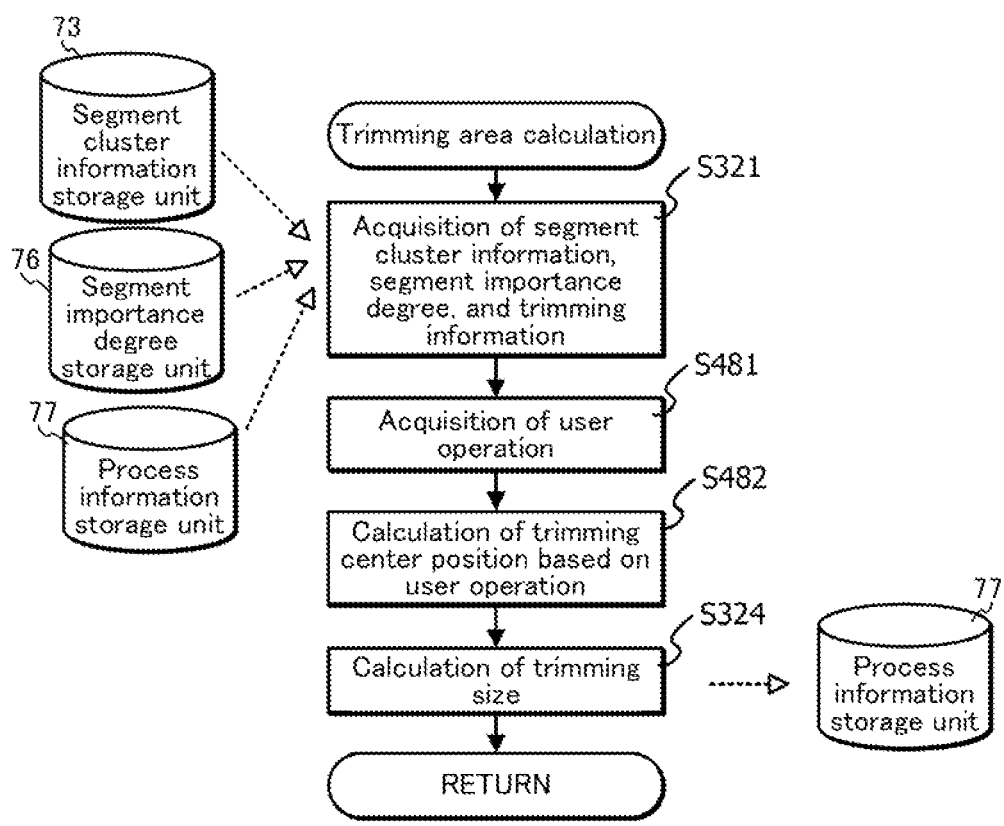
FIG. 48 is a flowchart showing operations of trimming area calculation.

FIG. 48 is a flowchart showing operations of trimming area calculation. Processing shown in FIG. 48 that are the same as those shown in FIG. 32 have the same step numbers as those in FIG. 32.

After acquisition of trimming information in Step S321 completes, the user operation acquisition unit 93 acquires a user operation (Step S481).

The user operation is acquired for example by displaying a menu containing a message indicating that "Please designate segment you hope to include in trimming area." to cause a user to designate a desired segment.

Alternatively, on the contrary, the user operation may be acquired by making the user conscious of nothing special. Specifically, assume the case where the image processing device 3b is a tablet PC with a touch sensor for example. In this case, the image processing device 3b may acquire the number of touch operations made on each segment by the user, or may acquire the number of enlargement (i.e., pinchout) operations made on each segment by the user with his fingers spread apart.

Next, the area calculation unit 62 calculates the trimming center position based on the user operation (Step S482). Specifically, as shown in FIG. 49, the trimming center position is calculated basically in the same manner as that shown in FIG. 36. Note that the method shown in FIG. 49 differs from that shown in FIG. 36 in that the number of operations (designations) made on each segment by the user is used as a weighting coefficient. In FIG. 49, the weighting coefficient is set depending on the number of operations (designations). Alternatively, the highest weighting coefficient may be given to a segment designated clearly by the user via the menu displayed for trimming area determination such as described above.

FIG. 50 shows the equation shown in FIG. 49 with respect to an image P.

In this way, by calculating the trimming center position with use of the user operation (designation), it is possible to approximate the trimming center position to a segment regarded as important by the user. This leads to an expectation that all the segments regarded as important by the user are included within the trimming area.

Embodiment 4

Figure 51:
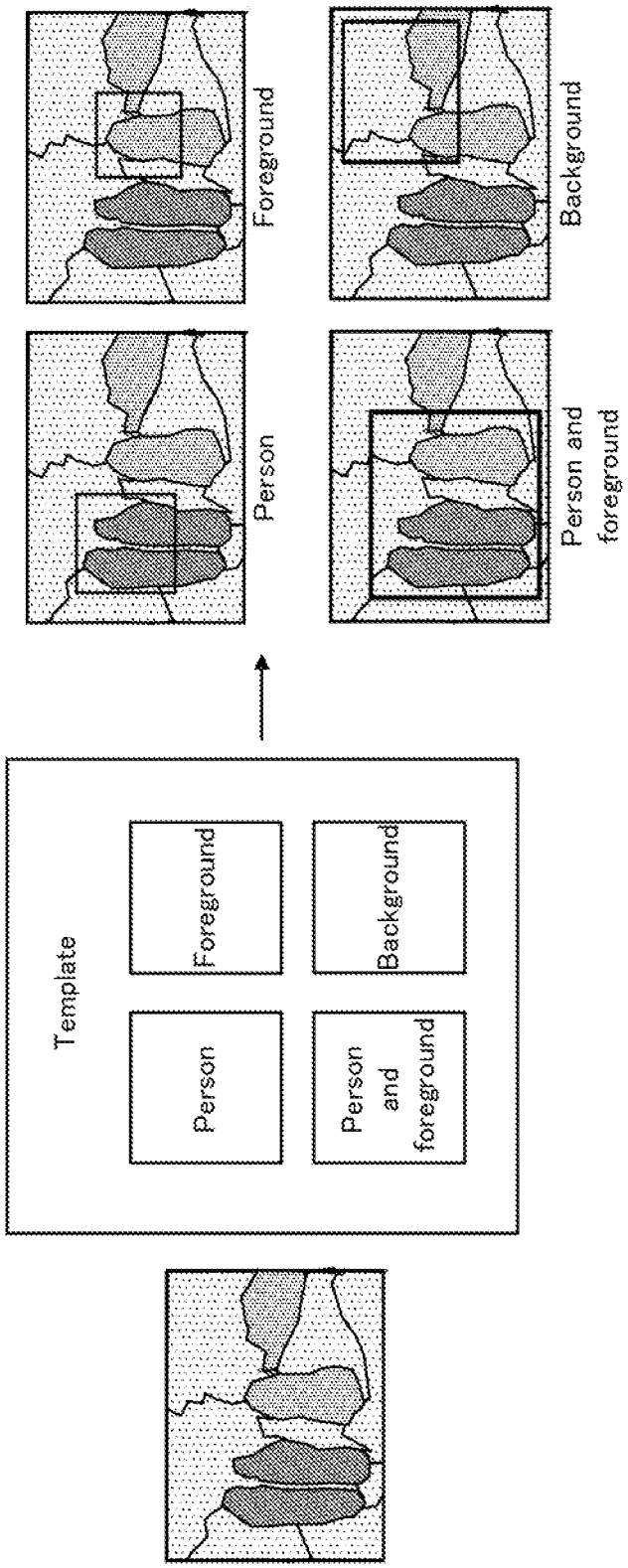
FIG. 51 shows the outline of Embodiment 4.

In the present embodiment, as shown in FIG. 51, a trimming area that is a trimming target is adjusted in consideration of a trimming condition contained in a template. The trimming condition includes a condition relating to weighting on a segment importance degree of at least one of an object segment, a foreground segment, and a background segment. After adjustment of the segment importance degree of the segment based on the weighting, a trimming area is calculated.

Figure 52:
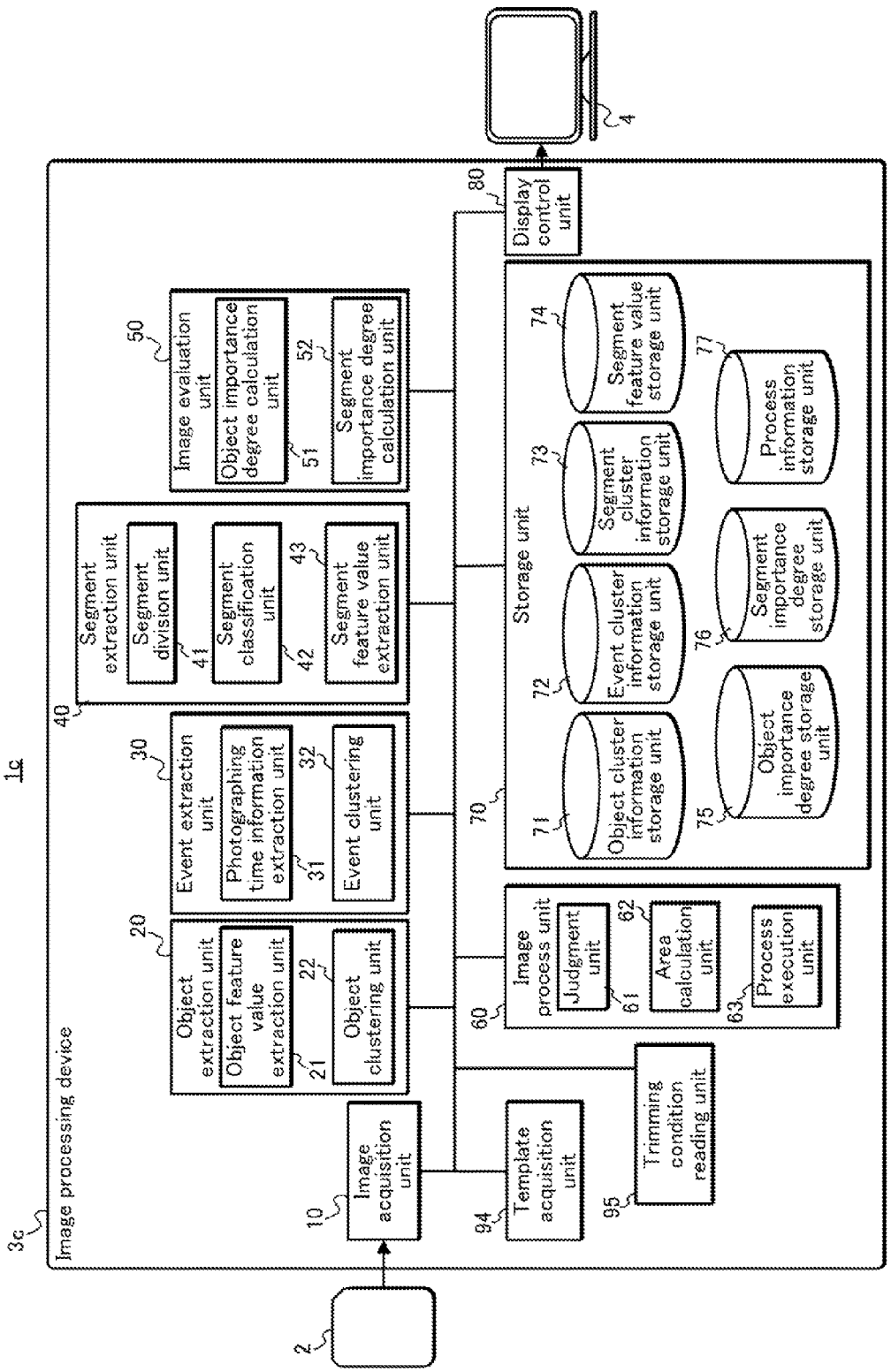
FIG. 52 is a block diagram showing an image processing system relating to Embodiment 4.

FIG. 52 is a block diagram showing an image processing system 1c relating to Embodiment 4.

A template acquisition unit 94 included in an image processing device 3c acquires a template relating to trimming. This template contains a trimming condition in which a substitution equation of weighting coefficient for each of the types of segments including the object segment, the foreground segment, and the background segment.

According to this substitution equation, twice the weighting coefficient is calculated for the object segment, 1.5 times the weighting coefficient is calculated for the foreground segment, and 0.5 times the weighting coefficient is calculated for the background object, for example.

The trimming condition reading unit 95 reads the trimming condition contained in the template acquired by the template acquisition unit 94.

The area calculation unit 62 calculates the trimming center position in accordance with the read trimming condition.

<Operations>

Figure 53:
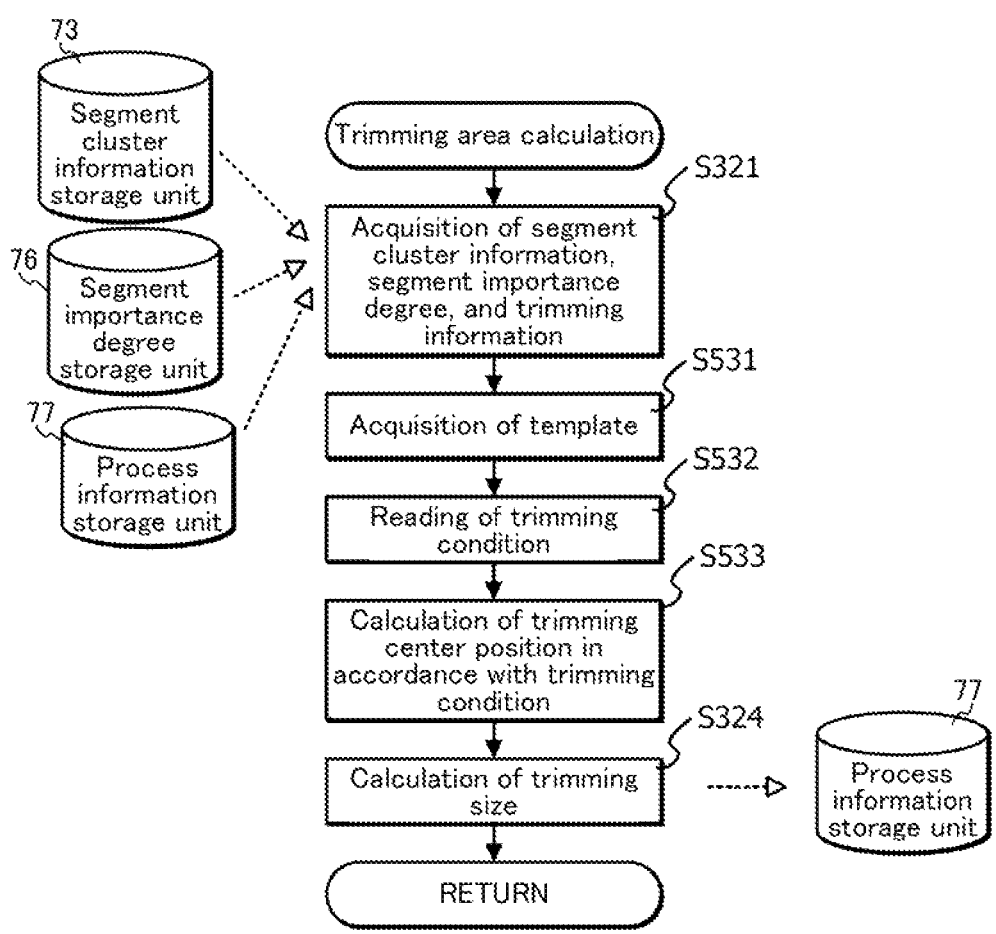
FIG. 53 is a flowchart showing operations of trimming area calculation.

FIG. 53 is a flowchart showing operations of trimming area calculation. Processing shown in FIG. 53 that are the same as those shown in FIG. 32 have the same step numbers as those in FIG. 32.

After the processing of Step S321 completes, the template acquisition unit 94 acquires a template (Step S531). The trimming condition reading unit 95 reads a trimming condition contained in the acquired template (Step S532).

The area calculation unit 62 calculates the trimming center position in accordance with the read trimming condition (Step S533). Specifically, as shown in FIG. 54, the area calculation unit 62 multiplies a weighting coefficient for each segment written in the trimming condition by the segment to calculate the trimming center position. In this way, it is possible to approximate the trimming center position to a segment to which a high weighting coefficient is given. This leads to an expectation that all the segments designated as important by the trimming condition contained in the template are included in a trimming region.

Embodiment 5

In Embodiments 1 to 4, the description has been provided with use of trimming as an example of image process. Alternatively, the image process is not limited to trimming. The methods described in Embodiments 1 to 4 are applicable to various processes for bringing a specific area in an image to an attention, that is, accentuating the specific area.

Figure 55:
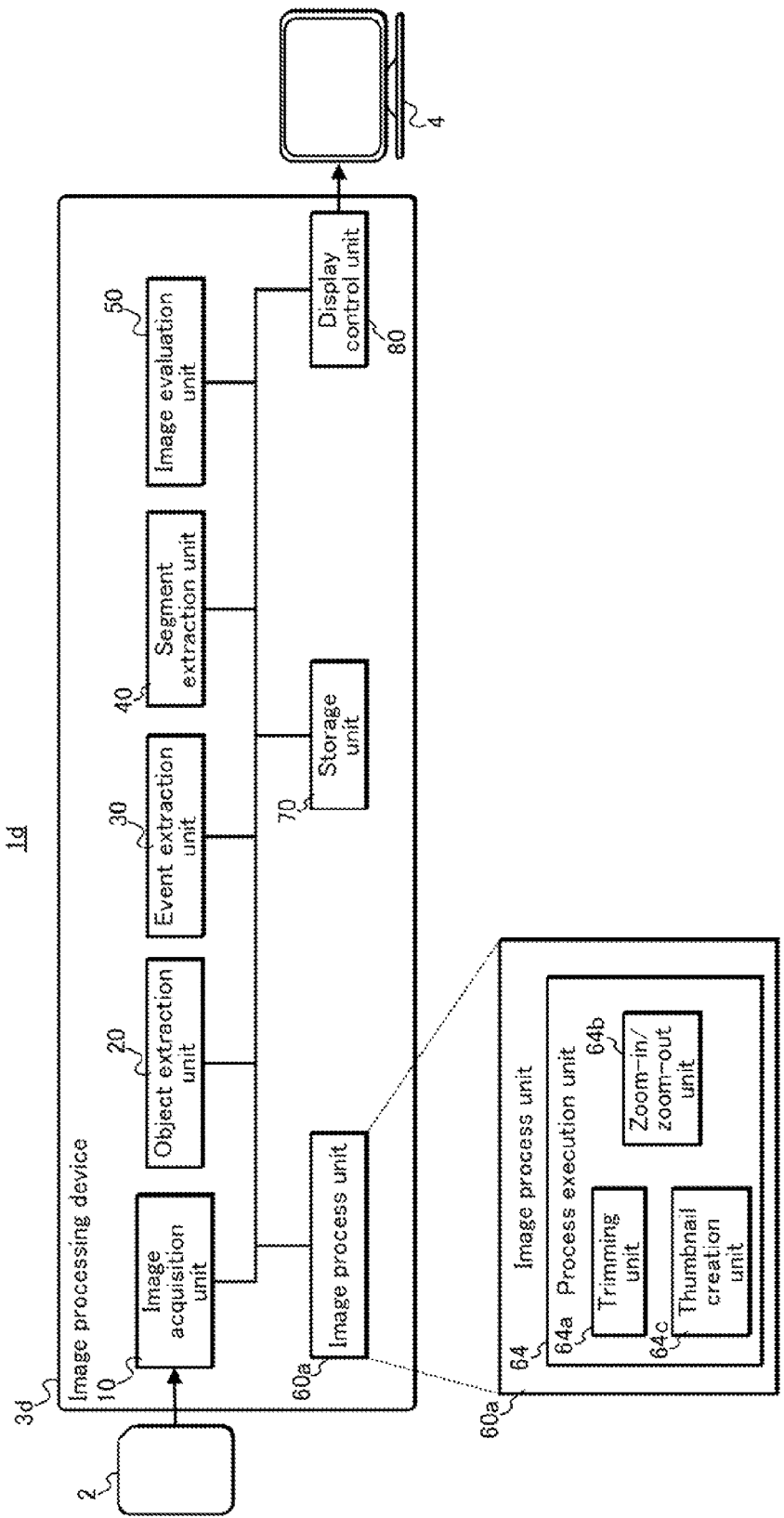
FIG. 55 is a block diagram showing an image processing system relating to Embodiment 5.

FIG. 55 is a block diagram showing an image processing system 1d relating to Embodiment 4.

An image processing device 3d includes an image process unit 60a that includes a process execution unit 64.

The process execution unit 64 includes a trimming unit 64a, a zoom-in/zoom-out unit 64b, and a thumbnail creation unit 64c.

The zoom-in/zoom-out unit 64b performs zoom-in or zoom-out on an image during slide movie playback such that a segment having a high segment importance degree is centered in the image (FIG. 56A). Such zoom-in or zoom-out operations bring a person and an object that are estimated to be important for the user into closeup.

The thumbnail creation unit 64c creates a thumbnail of an image such that a segment having a high segment importance degree is focused in the image (FIG. 56B).

Such a thumbnail accentuates an object that is estimated to be important for the user, unlike a general thumbnail resulting from simply reducing the size of the image.

<Supplement 1>

Although the description has been provided on the above embodiments, the present invention is not limited to the above embodiments. The present invention is also applicable in various embodiments for achieving the above aim of the present invention or other aims related or associated thereto. For example, the following modifications are construed as being within the scope and spirit of the present invention.

(1) The method described in Embodiment 1 is broadly applicable to a method of evaluating segments included in an image by evaluating, with use of a segment A which is comparatively easily recognized, a segment B which is comparatively difficult to be recognized. In Embodiment 1, the segment A corresponds to an object segment, and the segment B corresponds to a foreground segment and a background segment.

Also, in Embodiment 1, the description has been provided with use of the example where each object is a person. However, each object is not limited to a person. At present, compared with recognition technologies on generic objects, the research progresses on the face recognition technology and recognition on persons are performed with a high precision. Accordingly, a person is simply taken as an example of each object.

For example, the following could be possibly realized. In the case where, at present or in the future, model data relating to cats are stored and recognition on cats are performed with a high precision, an object segment representing a cat is used for evaluating other segment. In addition to cats, cars, plants, insects, animal pets such as dogs may be employed as objects.

(2) In Embodiment 1, as a segment importance degree of an object segment, an object importance degree of an object appearing in the object segment is used without modification.

Alternatively, the object importance degree of the object may be evaluated for example based on a degree indicating how a person that is the object looks like in an image, such as an occupation degree, a focus, a face direction, and a smile degree. In this case, if there is any element relating to evaluation, specifically, if the occupation degree of the person is high, focus is brought into the person, the face of the person faces the front, the smile degree is high, or the like, the object importance degree would be evaluated more highly.

(3) In Embodiment 1, when the zoom-in trimming method or the zoom-out trimming method is used, a segment having the highest segment importance degree among all the segments of each type of segment is included in a trimming area. Alternatively, any other method may be used as long as relative comparison in segment importance degree is made between segments to give preference to a segment having a higher segment importance degree.

For example, as a condition of a segment to be included in a trimming area, the following condition may be employed that a segment has a predetermined or higher segment importance degree, or has a segment importance degree that is in a predetermined or higher rank, for example.

Also, the trimming judgment (Step S291 in FIG. 29 and FIG. 30) does not necessarily need to be performed. Instead, one of or both of the zoom-out trimming method and the zoom-in trimming method may be performed, or the setting may be received from the user as to which of the zoom-out trimming method and the zoom-in trimming method is to be used.

(4) In Embodiment 1, segments divided from an image are classified as any one of the three types of an object segment, a foreground segment, and a background segment. Alternatively, in the case where only trimming is performed with use of no background segment such as the case where the zoom-in trimming method is used, the segments may be classified as any one of two types of an object segment and a foreground segment.

(5) With respect to the calculation processing of segment importance degrees of foreground segments (FIG. 24 and FIG. 25) and the calculation processing of segment importance degrees of background segments (FIG. 26 and FIG. 27), the following describes a specific example of a method of selecting an image for use by the segment importance degree calculation unit 52, with reference to FIG. 37.

Assume that seven images a to g are clustered into an event a, and a target image for calculating importance degree is the image d (portion (a) of FIG. 37).

The first method uses the target image and all the other remaining images (portion (b) of FIG. 37). In the example shown in the portion (b) of FIG. 37, the first method uses the target image d and the other remaining six images a to c and e to g. The method described in Embodiment 1 corresponds to the first method.

The second method uses the target image and one or more images each having a predetermined or less photographing time interval with the target image (portion (c) of FIG. 37). In the example shown in the portion (c) of FIG. 37, the second method uses the target image d and the images b, c, and e each having the predetermined or less photographing time interval with the target image d, such as a time interval for some seconds to some minutes. According to the second method compared with the first method, it is possible to decrease the number of images for use in calculating the segment importance degrees of the foreground segment or the background segment, with use of a photographing time of each of the images. This is useful for decreasing processing loads. Also, according to the second method, segment selection is performed based on the photographing time interval. Accordingly, in the calculation processing of the segment importance degree of the foreground segment and background segment (FIG. 25 and FIG. 27), the calculation may be performed without using the photographing time interval.

The third method uses the target image and one or more images each having a predetermined or higher similarity degree with the target image in terms of foreground segment or background segment (portion (d) of FIG. 37). In the example shown in the portion (d) of FIG. 37, the third method uses the target image d and the images a, c, and f each having the predetermined or higher similarity degree with the target image d in terms of foreground segment or background segment. The third method uses only an image that is similar to the target image d to a certain degree, thereby contributing to calculation of a segment importance degree of the foreground segment or the background segment with a higher reliability.

Note that the image selection method is not limited to the above examples. For example, an image immediately anterior or immediately posterior to the target image may be selected. Also, the number of images to be selected may be one or a predetermined value. For example, the number of images to be selected may be a value calculated depending on the number of images that are processing targets.

(6) In the respective examples shown in FIG. 33 and FIG. 34, the trimming area is a rectangle. Alternatively, the trimming area may be a rectangle with the rounded edges, an ellipse, or a circle. For example, in the case where trimming is necessary for an image to be placed within a certain frame to create an album, the shape of a trimming area depends on the shape of the certain frame. In other words, the shape of the trimming area may depend on an intended purpose of trimming.

(7) The respective image processing devices described in the above embodiments each may be embodied as an AV device such as a BD recorder, a stationary terminal such as a personal computer and a server terminal, a mobile terminal such as a digital camera and a mobile phone, or the like that each function as the image processing device.

Alternatively, the respective image processing devices described in the above embodiments each may be embodied as a server device that provides, as network services, the methods described in the above embodiments.

Figure 38:
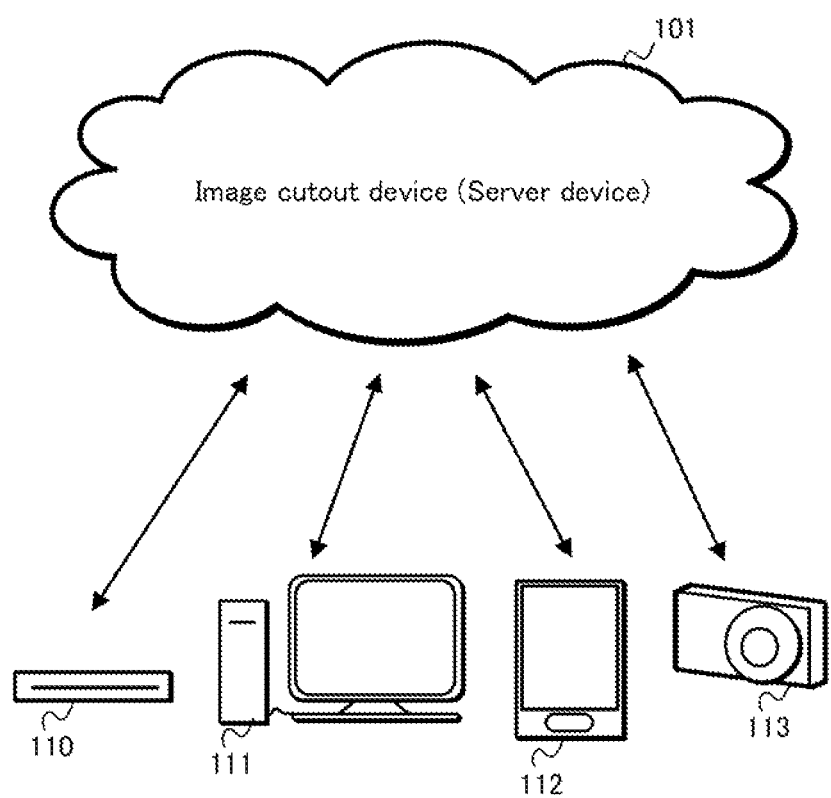
FIG. 38 shows an example of an image processing system.

In this case, the following structure may be available as shown in FIG. 38. When a server device 101 receives a content from an AV device 110, a personal computer 111, a portable device 112, a digital camera 113, or the like that stores therein contents via a network, the server device 101 performs image processing on the received content with use of the methods described in the above embodiments. Then, the server device 101 transmits results of the image processing to the AV device 110, the personal computer 111, the portable device 112, the digital camera 113, or the like via the network.

Also, the methods described in the above embodiments may be realized in the following manner that a memory has stored thereon a program in which the procedure of the methods is written, and a CPU (Central Processing Unit) or the like reads the program from the memory and executes the read program.

Alternatively, the program in which the procedure of the methods is written may be stored in a storage medium such as a DVD for distribution. Further alternatively, the program in which the procedure of the methods is written may be broadly distributed via a distribution medium such as the Internet.

The respective components relating to the above embodiments each may be embodied as an LSI (Large Scale Integration) that is an integrated circuit. Each of the components may be separately integrated into a single chip, or integrated into a single chip including part or all of the circuits. The description has been made on the basis of an LSI in the above. Alternatively, the name of the integrated circuit may differ according to the degree of integration of the chips. Other integrated circuits include an IC (integrated circuit), a system LSI, a super LSI, and an ultra LSI. Furthermore, the method applied for forming integrated circuits is not limited to the LSI, and the present invention may be realized on a dedicated circuit or a general purpose processor. For example, the present invention may be realized on an FPGA (Field Programmable Gate Array) programmable after manufacturing LSIs, or a reconfigurable processor in which connection and settings of a circuit cell inside an LSI are reconfigurable after manufacturing LSIs. Also, these functional blocks may be calculated with use of a DSP (Digital Signal Processor), a CPU, or the like. Furthermore, these processing steps may be processed by being stored into a storage medium as programs and executed.

(8) In Embodiment 2, the description has been provided on the example where an image is acquired from the user B who is a friend on the SNS of the user A.

Alternatively, in order to increase or decrease the range of image acquisition, an image may be acquired from the following users, for example.

An image may be acquired from a user who is a friend of a friend of the user A.

Also, an image may be acquired from a user who has a predetermined or higher intensity of connection on the SNS with the user A.

Note that judgments as to whether a user is a "friend of a friend" and as to whether the user has an "intensity of connection" are made with use of an API on a social graph provided by the SNS.

<Supplement 2>

The above embodiments of the present invention include the following aspects.

(1) An image processing device relating to an embodiment of the present invention comprises: a division unit configured to divide each of a plurality of images into a plurality of segments; and a calculation unit configured to calculate a segment importance degree of each of the segments divided from one of the plurality of images, based on relations between the segment and other of the segments divided from the one image or relations between the segment and any of the segments divided from each of one or more predetermined images among the plurality of images.

(2) In the section (1), the image processing device may further comprise a classification unit configured to classify each of the divided segments as one of an object segment, a foreground segment, and a background segment.

(3) In the section (2), the classification unit may classify, as an object segment, a segment including an area where a face is recognized to appear and an area where a body is estimated to appear.

(4) In the section (2), the classification unit may classify, as a foreground segment, a segment including an area that is different from an adjacent area, with use of at least one of color information, brightness information, edge direction information, and depth information of the one image.

(5) In the section (2), the calculation unit may calculate the segment importance degree of the segment, with use of at least one of an attraction degree of the segment, a concurrency degree of the segment, and an object importance degree.

(6) In the section (5), with respect to the segment classified as an object segment, the calculation unit may calculate the object importance degree of the object such that the higher an appearance frequency relating to an object cluster into which the object is clustered in the plurality of images is, the higher the object importance degree is, and calculates the segment importance degree of the segment based on the calculated object importance degree.

(7) In the section (5), with respect to the segment classified as a foreground segment or a background segment, the calculation unit may calculate the attention degree of the segment such that the shorter a distance between a position of the segment and an attention position in the one image estimated to have attracted a photographer's attention, the higher the attention degree is, and may calculate the segment importance degree of the segment based on the calculated attention degree.

(8) In the section (7), the calculation unit may calculate a center of gravity in the object segment of the one image, and calculate the attention position in the one image such that the center of gravity and the attention position are point symmetrical with respect to a center point in the one image.

(9) In the section (5), with respect to the segment classified as a foreground segment or a background segment, the calculation unit may calculate the concurrency degree of the segment based on at least one of (i) a similarity degree in foreground segment between the one image and each of the predetermined images or a similarity degree in background segment between the one image and each of the predetermined images, (ii) a photographing time interval between the one image and each of the predetermined images, and (iii) a distance between a position of the segment and an attention position in the one image estimated to have attracted a photographer's attention.

(10) In the section (2), the predetermined images may each have a certain or higher similarity degree in foreground segment with the one image.

(11) In the section (1), the image processing device may further comprise a process unit configured to calculate the center position and a size of a target area to be processed in the one image based on the respective segment importance degrees of the segments divided from the one image, and process the target area.

(12) In the section (11), the process unit may calculate a change degree in size of object segment and/or foreground segment between the one image and one of the plurality of images that has been photographed immediately before the one image, and calculate, as the target area, an area including one or more target segments to be processed among the object segment, the foreground segment, and the background segment divided from the one image, based on the calculated change degree.

(13) In the section (11), the image processing device may further comprise a user operation acquisition unit configured to acquire a user operation for target area designation, wherein the process unit may calculate the target area based on the user operation acquired by the user operation acquisition unit.

(14) In the section (11), the process unit may calculate the target area based on a template indicating conditions for target area settings.

(15) In the section (1), the image processing device may further comprise an image acquisition unit configured to acquire, from an image group shared on a network, one or more images relating to each of the plurality of images, wherein the division unit and the calculation unit may perform the division and the calculation with respect to each of the images acquired by the image acquisition unit in addition to the plurality of images.

(16) In the section (1), the predetermined images may be in a certain number, and each may be anterior or posterior to the one image in photographing time.

(17) In the section (1), a photographing time interval between the one image and each of the predetermined images may fall within a certain range.

(18) An image processing method relating to an embodiment of the present invention comprises: a division step of dividing each of a plurality of images into a plurality of segments; and a calculation step of calculating a segment importance degree of each of the segments divided from one of the plurality of images, based on relations between the segment and other of the segments divided from the one image or relations between the segment and any of the segments divided from each of one or more predetermined images among the plurality of images.

(19) A program relating to an embodiment of the present invention is a program for causing an image processing device to perform processing including an image processing step, the image processing step comprising: a division step of dividing each of a plurality of images into a plurality of segments; and a calculation step of calculating a segment importance degree of each of the segments divided from one of the plurality of images, based on relations between the segment and other of the segments divided from the one image or relations between the segment and any of the segments divided from each of one or more predetermined images among the plurality of images.

(20) An integrated circuit relating to an embodiment of the present invention comprises: a division unit configured to divide each of a plurality of images into a plurality of segments; and a calculation unit configured to calculate a segment importance degree of each of the segments divided from one of the plurality of images, based on relations between the segment and other of the segments divided from the one image or relations between the segment and any of the segments divided from each of one or more predetermined images among the plurality of images.

INDUSTRIAL APPLICABILITY

Conventionally, an area is cut out from an image after an object appearing in the image is recognized. Compared with this, according to the image processing device and the image processing method relating to the present invention, it is possible to estimate an area in an image that is important for a member of a family based on the tendency of images photographed by a member of the family, without recognizing an object appearing in the image. This estimation enables cut-out of an important area from an image such as an image in which an object, a landscape, and so on during a trip appears.

With use of this, when a user creates an album for contents in which family members appear, it is also possible to cut out an image including an important area so as to fit the image to the shape and the size of a frame of the album. Accordingly, the user looks back on an event more efficiently. Therefore, the present invention is useful not only as a stationary terminal such as a personal computer and a server terminal, but also as a mobile terminal such as a digital camera and a mobile phone.

REFERENCE SIGNS LIST 1, 1a, 1b, 1c, and 1d image processing system
2 storage medium
2a SNS server
3, 3a, 3b, 3c, and 3d image processing device
4 display
10 and 10a image acquisition unit
20 object extraction unit
21 object feature value extraction unit
22 object clustering unit
30 event extraction unit
31 photographing time information extraction unit
32 event clustering unit
40 segment extraction unit
41 segment division unit
42 segment classification unit
43 segment feature value extraction unit
50 image evaluation unit
51 object importance degree calculation unit
52 segment importance degree calculation unit
60 image process unit
61 judgment unit
62 area calculation unit
63 process execution unit
70 storage unit
71 object cluster information storage unit
72 event cluster information storage unit
73 segment cluster information storage unit
74 segment feature value storage unit
75 object importance degree storage unit
76 segment importance degree storage unit
77 process information storage unit
80 display control unit
90 event integration unit
91 event sameness judgment unit
93 user operation acquisition unit
94 template acquisition unit
95 trimming condition reading unit

The invention claimed is:

1. An image processing device comprising:
a division unit configured to divide each of a plurality of images into a plurality of segments; and
a calculation unit configured to calculate a segment importance degree of each of the segments divided from one of the plurality of images, based on one of: relations between the segment and other of the segments divided from the one image; and relations between the segment and any of the segments divided from each of one or more predetermined images among the plurality of images.

2. The image processing device of claim 1, further comprising
a classification unit configured to classify each of the divided segments as one of an object segment, a foreground segment, and a background segment.

3. The image processing device of claim 2, wherein
the classification unit classifies, as an object segment, a segment including an area where a face is recognized to appear and an area where a body is estimated to appear.

4. The image processing device of claim 2, wherein
the classification unit classifies, as a foreground segment, a segment including an area that is different from an adjacent area, with use of at least one of color information, brightness information, edge direction information, and depth information of the one image.

5. The image processing device of claim 2, wherein
the calculation unit calculates the segment importance degree of the segment, with use of at least one of an attraction degree of the segment, a concurrency degree of the segment, and an object importance degree.

6. The image processing device of claim 5, wherein
with respect to the segment classified as an object segment, the calculation unit calculates the object importance degree of the object such that the higher an appearance frequency relating to an object cluster into which the object is clustered in the plurality of images is, the higher the object importance degree is, and calculates the segment importance degree of the segment based on the calculated object importance degree.

7. The image processing device of claim 5, wherein
with respect to the segment classified as a foreground segment or a background segment,
the calculation unit calculates the attention degree of the segment such that the shorter a distance between a position of the segment and an attention position in the one image estimated to have attracted a photographer's attention, the higher the attention degree is, and calculates the segment importance degree of the segment based on the calculated attention degree.

8. The image processing device of claim 7, wherein
the calculation unit calculates a center of gravity in the object segment of the one image, and calculates the attention position in the one image such that the center of gravity and the attention position are point symmetrical with respect to a center point in the one image.

9. The image processing device of claim 5, wherein
with respect to the segment classified as a foreground segment or a background segment,
the calculation unit calculates the concurrency degree of the segment based on at least one of (i) a similarity degree in foreground segment between the one image and each of the predetermined images or a similarity degree in background segment between the one image and each of the predetermined images, (ii) a photographing time interval between the one image and each of the predetermined images, and (iii) a distance between a position of the segment and an attention position in the one image estimated to have attracted a photographer's attention.

10. The image processing device of claim 2, wherein
the predetermined images each have a certain or higher similarity degree in foreground segment with the one image.

11. The image processing device of claim 1, further comprising
a process unit configured to calculate a center position and a size of a target area to be processed in the one image based on the respective segment importance degrees of the segments divided from the one image, and process the target area.

12. The image processing device of claim 11, wherein
the process unit calculates a change degree in size of object segment and/or foreground segment between the one image and one of the plurality of images that has been photographed immediately before the one image, and calculates, as the target area, an area including one or more target segments to be processed among the object segment, the foreground segment, and the background segment divided from the one image, based on the calculated change degree.

13. The image processing device of claim 11, further comprising
a user operation acquisition unit configured to acquire a user operation for target area designation, wherein
the process unit calculates the target area based on the user operation acquired by the user operation acquisition unit.

14. The image processing device of claim 11, wherein
the process unit calculates the target area based on a template indicating conditions for target area settings.

15. The image processing device of claim 1, further comprising
an image acquisition unit configured to acquire, from an image group shared on a network, one or more images relating to each of the plurality of images, wherein
the division unit and the calculation unit perform the division and the calculation with respect to each of the images acquired by the image acquisition unit in addition to the plurality of images.

16. The image processing device of claim 1, wherein
the predetermined images are in a certain number, and are each anterior or posterior to the one image in photographing time.

17. The image processing device of claim 1, wherein
a photographing time interval between the one image and each of the predetermined images falls within a certain range.

18. An image processing method comprising:
a division step of dividing each of a plurality of images into a plurality of segments, performed by an image processing device; and
a calculation step of calculating a segment importance degree of each of the segments divided from one of the plurality of images, based on one of: relations between the segment and other of the segments divided from the one image; and relations between the segment and any of the segments divided from each of one or more predetermined images among the plurality of images.

19. A non-transitory computer readable medium having stored thereon a program for causing an image processing device to perform processing including an image processing step, the image processing step comprising:
a division step of dividing each of a plurality of images into a plurality of segments; and
a calculation step of calculating a segment importance degree of each of the segments divided from one of the plurality of images, based on one of: relations between the segment and other of the segments divided from the one image; and relations between the segment and any of the segments divided from each of one or more predetermined images among the plurality of images.

20. An integrated circuit comprising:
a division unit configured to divide each of a plurality of images into a plurality of segments; and
a calculation unit configured to calculate a segment importance degree of each of the segments divided from one of the plurality of images, based on one of: relations between the segment and other of the segments divided from the one image; and relations between the segment and any of the segments divided from each of one or more predetermined images among the plurality of image.

* * * * *